(12) United States Patent
Baldwin

(10) Patent No.: US 7,059,562 B2
(45) Date of Patent: Jun. 13, 2006

(54) VERTICAL LIFT FLYING CRAFT

(76) Inventor: G. Douglas Baldwin, 4 Harborview Rd., Port Washington, NY (US) 11050

( * ) Notice: Subject to any disclaimer, the term of this patent is extended or adjusted under 35 U.S.C. 154(b) by 0 days.

(21) Appl. No.: 10/931,801

(22) Filed: Aug. 31, 2004

(65) Prior Publication Data

US 2005/0109874 A1  May 26, 2005

Related U.S. Application Data

(63) Continuation of application No. 09/976,348, filed on Oct. 12, 2001, now Pat. No. 6,783,096.
(60) Provisional application No. 60/265,193, filed on Jan. 31, 2001.

(51) Int. Cl.
*B64C 17/04* (2006.01)

(52) U.S. Cl. .......................... 244/12.4; 244/56; 244/66
(58) Field of Classification Search ................ 244/7 C, 244/12.4, 12.1, 23 R, 23 D, 56, 66, 51, 52, 244/55, 54
See application file for complete search history.

(56) References Cited

U.S. PATENT DOCUMENTS

| | | | |
|---|---|---|---|
| 1,525,557 A | 2/1925 | Kleinschmidt | 244/7 C |
| 1,739,402 A | 12/1929 | Lombardi | 244/7 C |
| 1,757,842 A | 5/1930 | Leopold | 244/7 R |
| 2,448,392 A | 8/1948 | Quady et al. | 244/7 C |
| 2,673,695 A | 3/1954 | Perry | 244/7 C |
| 3,049,320 A | 8/1962 | Fletcher | 244/56 |
| 3,113,747 A | 12/1963 | Smith | 244/3 |
| 3,211,429 A | 10/1965 | Steward | 244/2 |
| 3,289,980 A | 12/1966 | Hill | 244/56 |
| 3,350,035 A | 10/1967 | Schlieben | 244/7 |
| 3,404,737 A | 10/1968 | Keder, Jr. | 170/135.22 |
| 3,532,302 A | 10/1970 | Dean | 244/17.19 |
| 3,589,646 A | 6/1971 | Mori | 244/144 |
| 3,966,142 A | 6/1976 | Corbett et al. | 244/12 A |
| 4,071,206 A | 1/1978 | Magill | 244/17.11 |
| 4,375,280 A | 3/1983 | Nicolaides | 244/13 |
| 4,378,919 A | 4/1983 | Smith | 244/118.1 |
| 4,537,372 A | 8/1985 | Forizs | 244/12.4 |
| 4,759,514 A | 7/1988 | Burkam | 244/17.21 |
| 4,928,907 A | 5/1990 | Zuck | 244/6 |
| 5,067,668 A | 11/1991 | Zuck | 244/7 R |

(Continued)

OTHER PUBLICATIONS

"LoGo", Web page printed 2002 from www.logovtol.com.
"Technical Information on the Moller Aerobot," published more than one year before applicant's earliest filing date.
Boeing Company. "V-22 Osprey Technical Specifications," web page from http://www.boeing.com/rotocraft/military/v22/v22spec.htm, dated 2003.
LoPresti Gordon VTOL, Inc. "Guardian and TurboHawk Background Information," Copyright 2001.
TBFlavenger_fly.jpg.Image from http://www.seniornet.org/ww2/gallery/photos/planes/TBF1avenger_fly.jpg, dated May 2001.

*Primary Examiner*—Galen Barefoot
(74) *Attorney, Agent, or Firm*—Louis J. Hofman; Edwin A. Suominen

(57) ABSTRACT

A disclosed vertical lift flying craft includes a lift unit that, during operation, develops a force including an upward component. A payload unit suspends from the lift unit. The payload unit suspends from the lift unit in such a way as to impart lateral stability while remaining capable of horizontal flight, without incurring the adverse effects of a downward pitching moment. In addition to a lift unit and a payload unit, the vertical lift flying craft includes a pair of bearings and a suspension structure, which cooperate to suspend the payload unit from the lift unit. Other systems and methods are also disclosed.

20 Claims, 31 Drawing Sheets

U.S. PATENT DOCUMENTS

| | | | |
|---|---|---|---|
| 5,096,143 A | 3/1992 | Nash | 244/87 |
| 5,188,313 A | 2/1993 | Piaseki | 244/3 |
| 5,395,073 A | 3/1995 | Rutan et al. | 244/48 |
| 5,560,568 A | 10/1996 | Schmittle | 244/48 |
| 5,758,844 A | 6/1998 | Cummings | 244/7 C |
| 5,863,013 A | 1/1999 | Schmittle | 244/48 |
| 6,086,014 A | 7/2000 | Bragg, Jr. | 244/2 |
| 6,138,943 A | 10/2000 | Huang | 244/2 |
| 6,347,764 B1 | 2/2002 | Brandon et al. | 244/17.11 |
| 6,598,827 B1 | 7/2003 | Kusic | 244/17.11 |

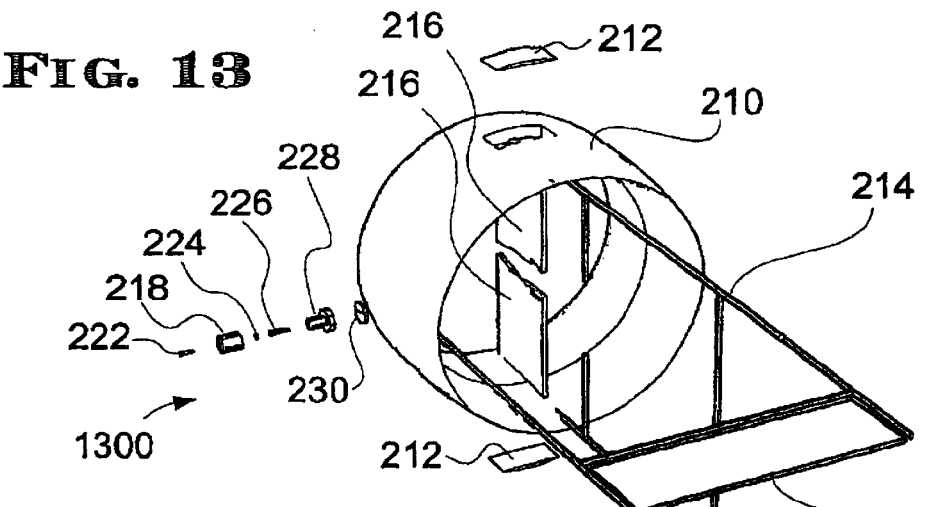
FIG. 13
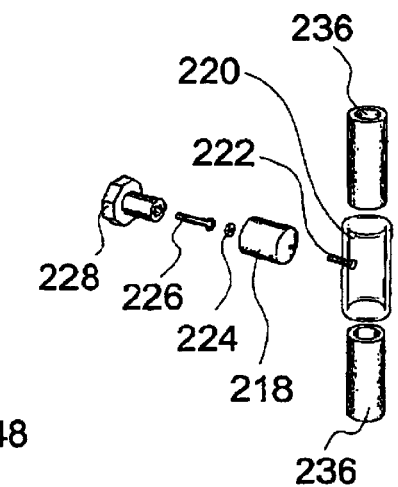
FIG. 14
FIG. 15

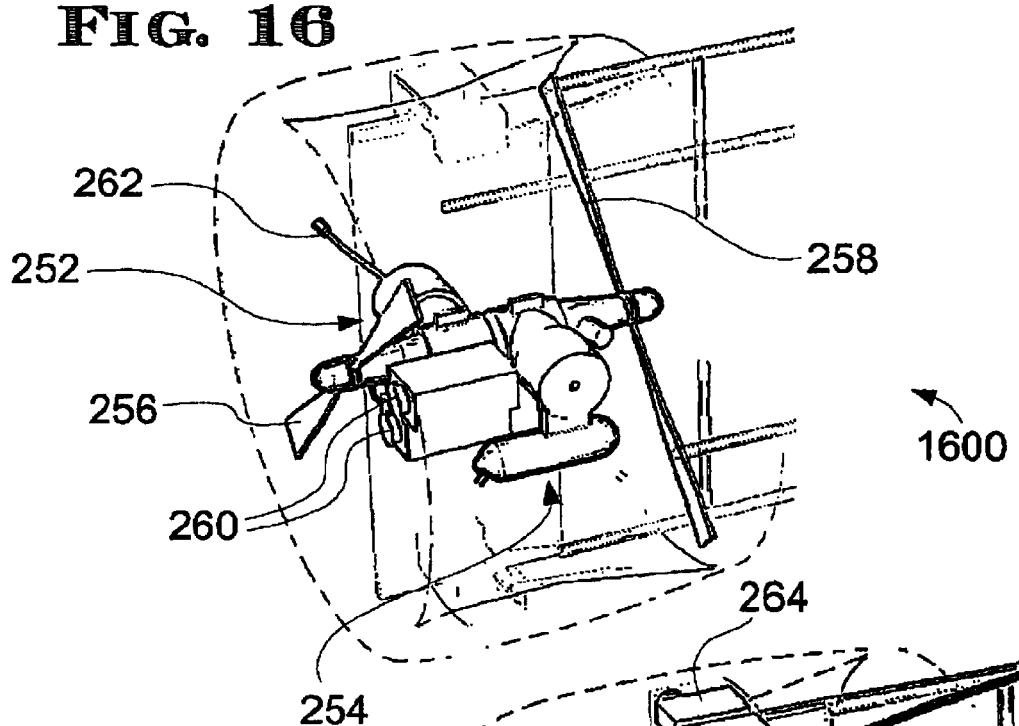

FIG. 21
FIG. 23
FIG. 22
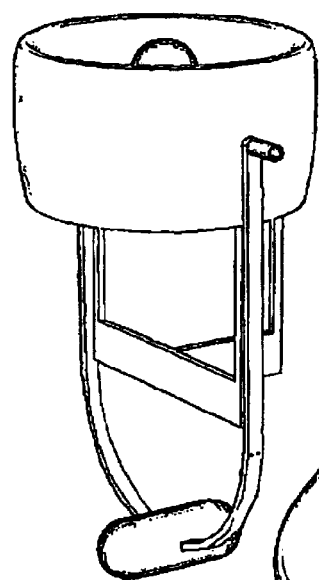
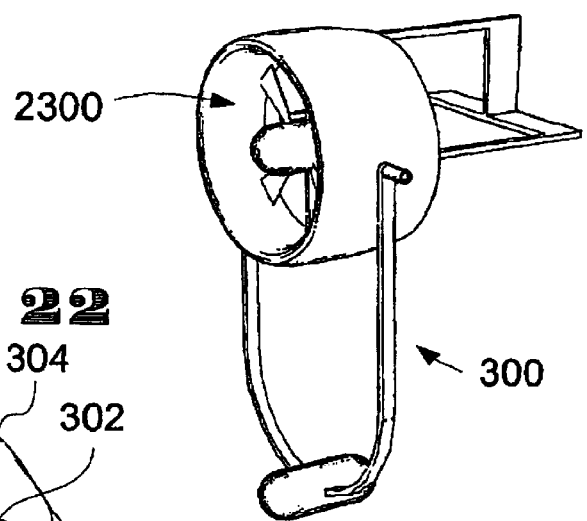
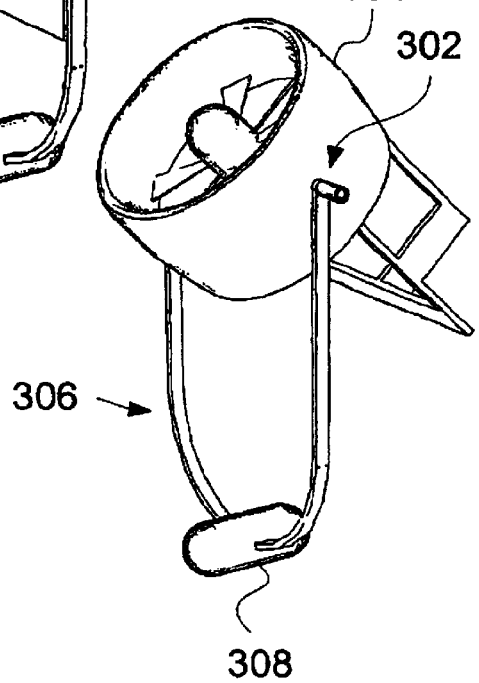
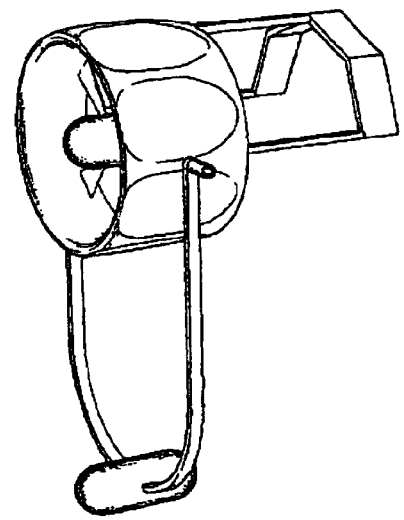
2300
300
304
302
306
308
FIG. 24

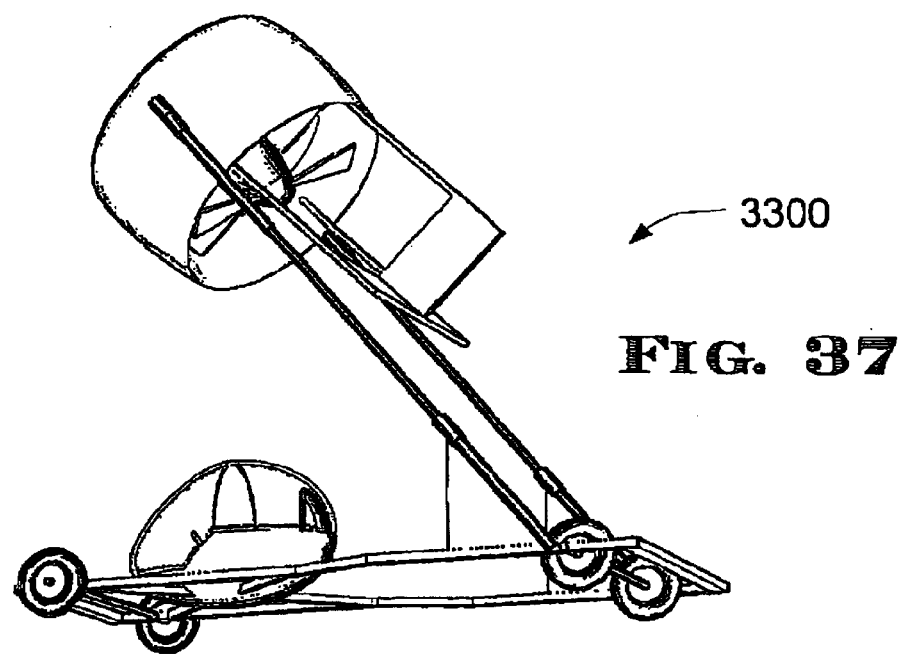
FIG. 37
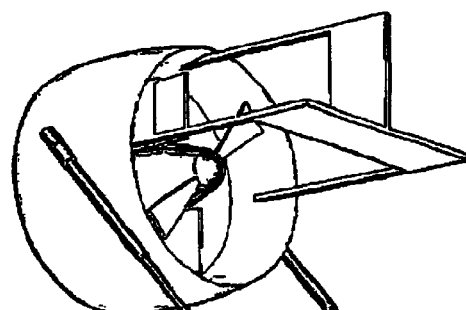
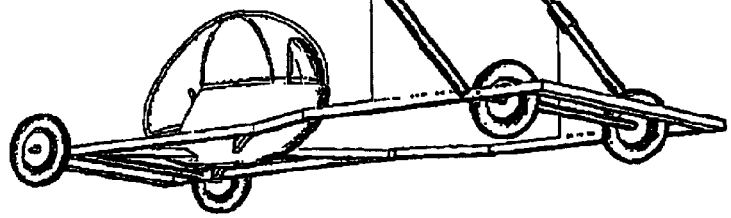
FIG. 38

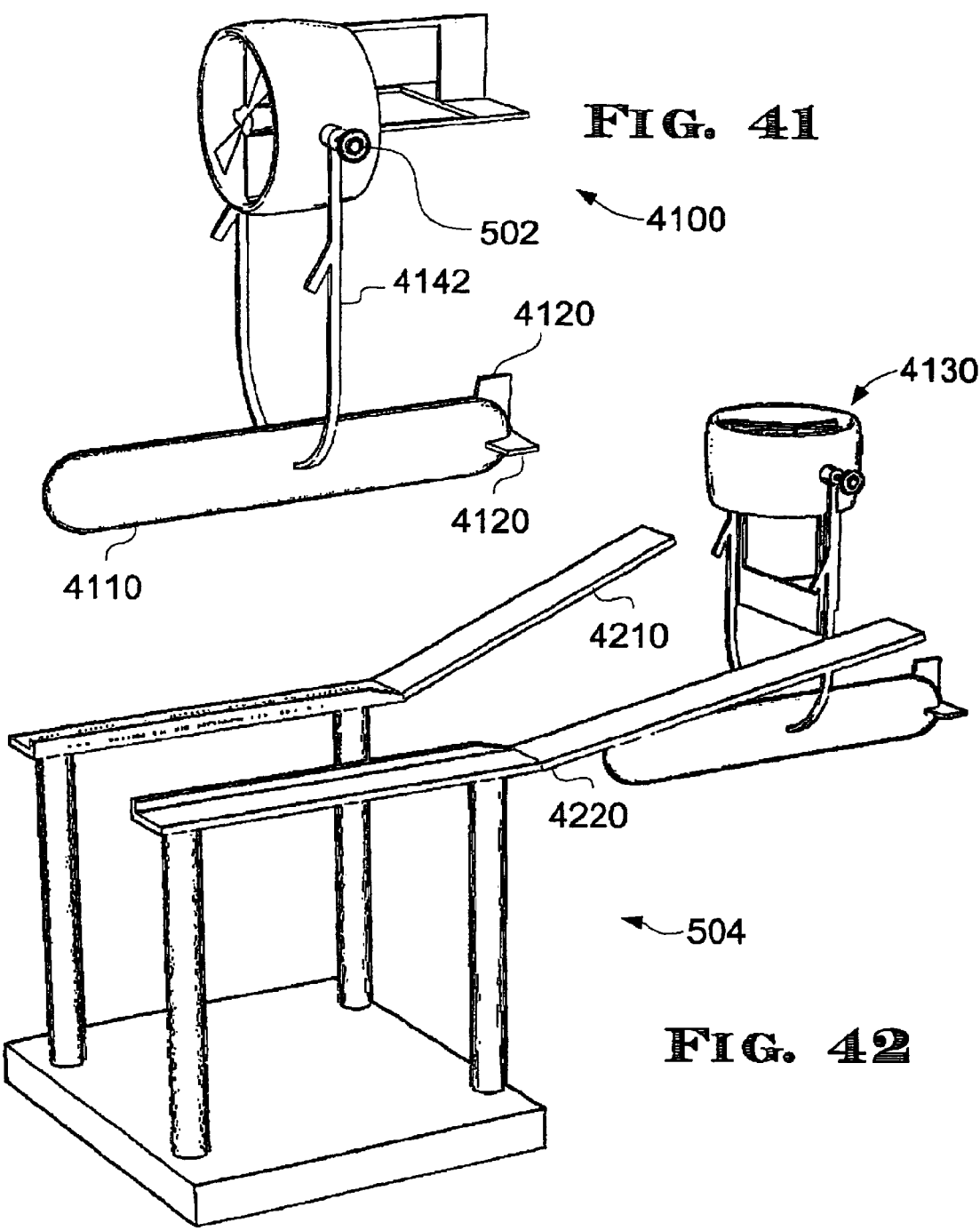

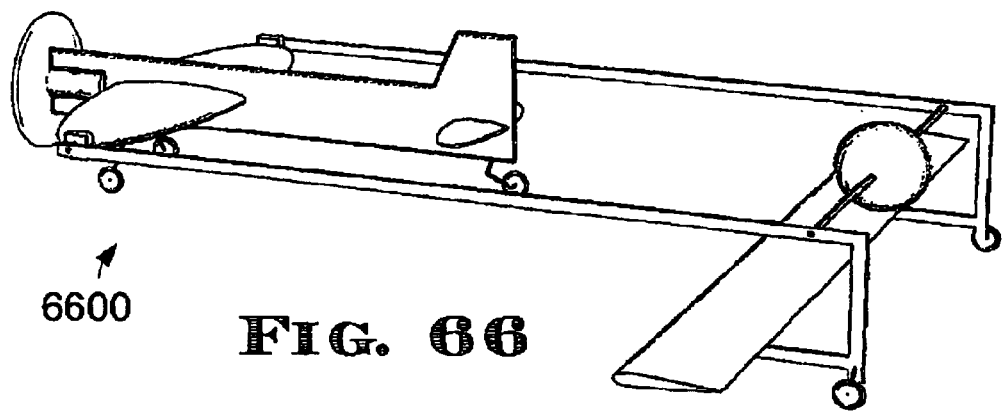
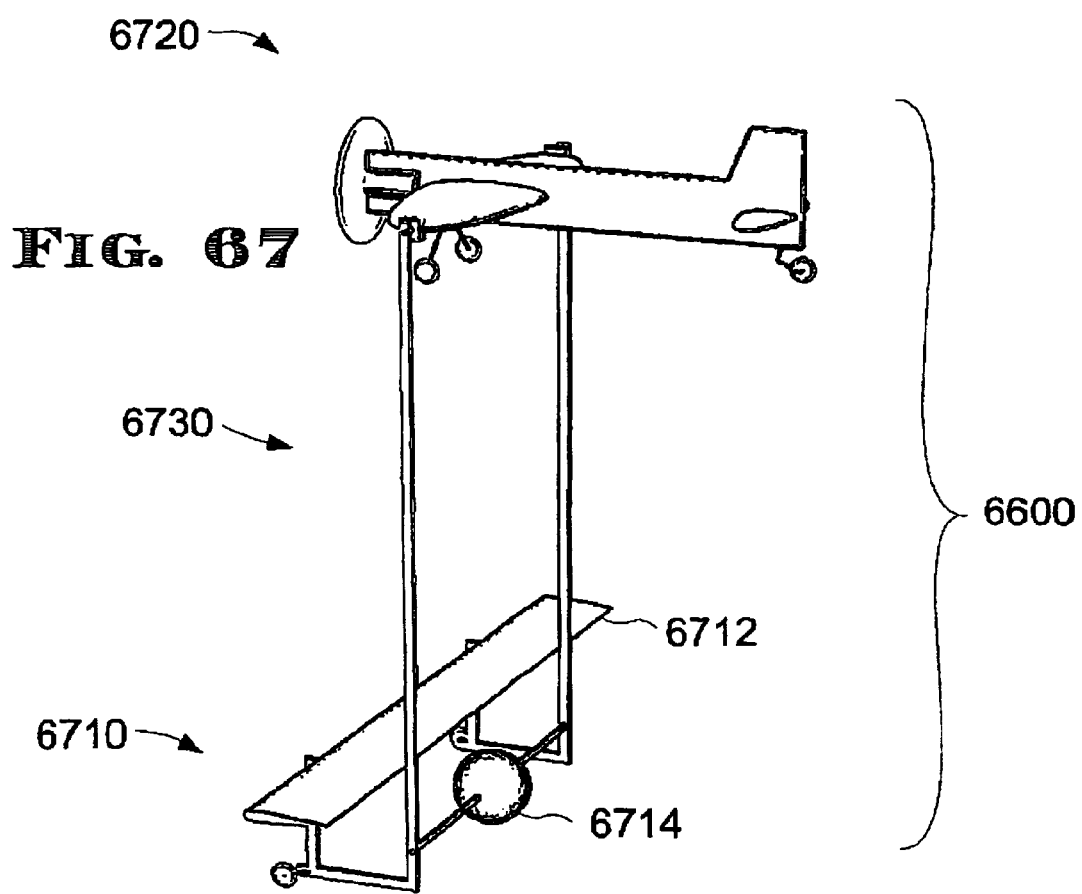

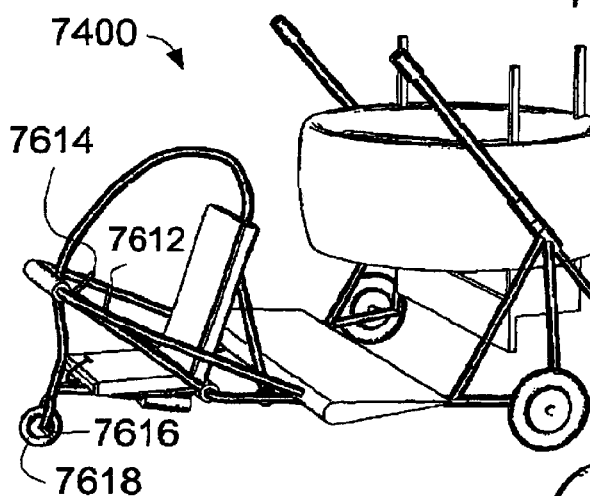
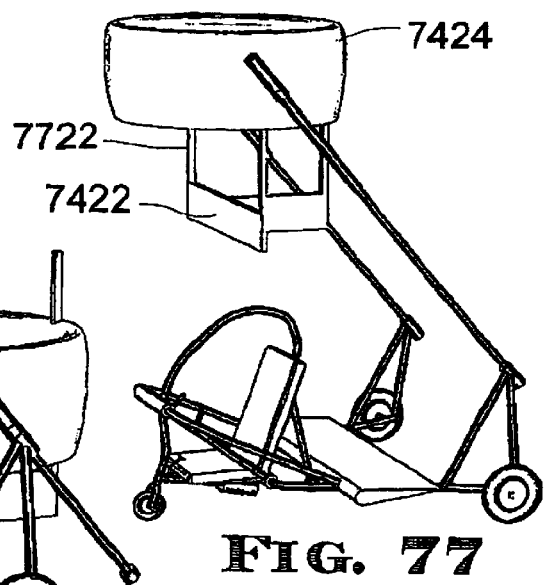
FIG. 76
FIG. 77
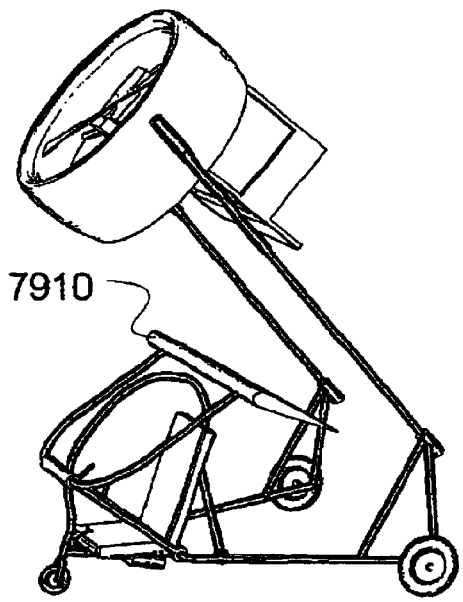
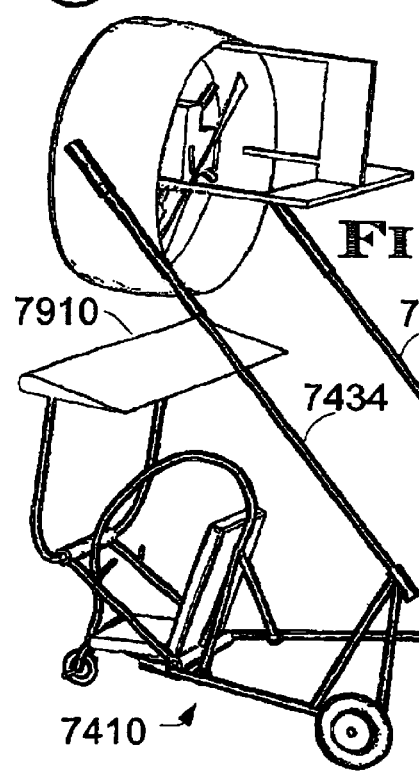
FIG. 78
FIG. 79

VERTICAL LIFT FLYING CRAFT

CROSS-REFERENCE TO RELATED APPLICATIONS

This application claims the benefit of priority under 35 U.S.C. §119 (a) and (b) to french Application No. 0201506, filed Feb. 7, 2002, and European Pat. No. EP 1,338,324 filed Jan. 20, 2003, the entire contents of which are both incorporated herein by reference. Both of those applications are incorporated herein by reference.

BACKGROUND OF THE INVENTION

Vertical Takeoff and Landing (vertical lift) aircraft have long been considered desirable because of their ability to hover in flight and transition in and out of flight without a runway, in addition to flying in a horizontal direction. Although rotating-wing vertical lift aircraft (helicopters) have long been available, a rotating wing requires substantial clearance and can present safety hazards. In addition, rotating-wing aircraft generally have poor cruise performance compared to fixed-wing aircraft. Consequently, other types of aircraft, for example lifting off in a "tail sitting" configuration or employing "fan in wing" structure, are considered preferable in many situations.

During stationary flight, a rotating-wing vertical lift aircraft is supported by lift from air flow across its wing. Because the lift is developed across a relatively wide area, rotating-wing vertical lift aircraft possess some inherent stability against roll. Vertical lift aircraft other than rotating-wing aircraft do not enjoy such lateral stability because they are supported by a relatively compact source of thrust. For example, a ducted-fan type of vertical lift aircraft may be viewed, in operation, as sitting on a column of air. Although multiple thrusters can be employed for additional lateral stability, such an arrangement adds complexity and presents similar size disadvantages to those of a rotating-wing vertical lift aircraft.

Also, certain conventional types of fixed-wing vertical lift aircraft are capable of transitioning between vertical flight and horizontal flight while part or all of the vehicle transitions between a vertical and horizontal orientation with respect to the ground. Conventional approaches are problematic, however, when it comes to accommodating a payload while the vehicle makes the transition. Conventional methods for orienting the payload with respect to the rotating vehicle generally can be grouped into two broad categories: fixed payload and mechanically rotated payload.

Permitting the payload to rotate with a vertical lift aircraft from a horizontal to vertical orientation is generally undesirable. If the payload performs ground observation such as monitoring ground-based targets or tracking a vertical landing site, for example, compensations must be made while transitioning between horizontal and vertical orientations. If the payload includes humans, they must deal with the discomfort of moving between sitting and lying positions. These deficiencies have a compound effect when a pilot attempts to land vertically or visually track ground-based targets because of the combined disorientation and discomfort they cause.

Some conventional vertical lift aircraft have been developed in which all or part of the vehicle mechanically rotates with respect to the payload, thus permitting the payload to remain in a substantially fixed orientation while the rest of the aircraft rotates. When viewed from the perspective of the rotating portion of the aircraft, it is the payload that is mechanically rotated. A broad class of such vertical lift aircraft configurations can be categorized as having a mechanically rotated payload, including tilt rotor, tilt duct, and tilt wing. This class of aircraft presents a serious control problem, in that the mechanical rotations tend to be destabilizing and must be carefully coordinated with aerodynamic controls to keep the vehicle airborne. Furthermore, the mechanism needed to affect the rotation tends to be heavy, which adds weight and reduces aircraft performance. In addition, the mechanism represents a single failure point with potentially destabilizing failure modes. When considered together with the above problems, the typical complexity of the mechanism can present a serious safety hazard.

In view of the many problems associated with conventional rotating-wing and fixed-wing vertical lift aircraft, it would be desirable to have a new type of vertical lift aircraft.

SUMMARY OF THE INVENTION

A vertical lift flying craft according to various aspects of the present invention includes a lift unit that, during operation, develops a force including an upward component. A payload unit suspends from the lift unit. The payload unit (which may be an integral part of the vertical lift flying craft or provided as a removable object) suspends from the lift unit in such a way as to impart lateral stability while remaining capable of horizontal flight, without incurring the adverse effects of a downward pitching moment. In addition to a lift unit and a payload unit, such a vertical lift flying craft includes a pair of bearings and a suspension structure, which cooperate to suspend the payload unit from the lift unit. The bearings include two bearing members that are each rotatable with respect to each other about a rotational axis. The suspension structure includes two ends. One end of the suspension structure couples to one of the bearing members, while the other end couples to the payload unit.

By suspending the payload unit from the lift unit through bearings, the suspension structure permits the payload unit to move about the rotational axis, independent of the direction of the force developed by the lift unit. By permitting the payload unit to move in such a manner, for example to reach an equilibrium position when acted upon by wind resistance during horizontal flight, the suspension structure suspends the payload unit while avoiding the development of a downward pitching moment.

The bearing members are rotatable about a rotational axis, rather than as a universal joint. The payload unit is thus constrained from significant movement parallel to the rotational axis, which is perpendicular to the force developed by the lift unit. Consequently, a rigid moment arm is developed, about the roll axis of the lift unit, such that lateral stability is imparted to the lift unit. Advantageously, the lift unit does not need to be structured to have inherent lateral stability.

The lift unit is coupled to one of the bearing members so as to be capable of free rotation through an angular range (which may be limited, for example to 90 degrees) about the rotational axis. The lift unit includes a suitably configured thrusting system, an aerodynamic lift system, or both for developing a force to the lift unit in the direction of a force vector. By rotating through an angular range, the lift unit is capable of developing force as appropriate in various embodiments of the invention and in various modes of flight. For example, force may be applied in the direction of a vertical force vector (for hovering and vertical takeoff); in the direction of a horizontal force vector (for airfoil-assisted horizontal flight); and in the direction of a vertically angled force vector (for horizontal flight supported by the lift unit).

According to another advantageous aspect of the present invention, the suspension structure is coupled to the payload unit, at one end, through a bearing. By permitting the payload unit to rotate independent of the orientation of the suspension structure, such a coupling arrangement provides particular advantages. For example, when the end of the suspension structure is coupled to the payload unit (through the bearing) above the center of mass of the payload unit, the payload unit can be expected to maintain a constant orientation, regardless of the orientation of the suspension structure. Consequently, the payload unit may remain substantially horizontal even when pushed aft of the lift unit by wind resistance. Advantages of having the payload unit maintain horizontal orientation include reduced wind resistance and, in flying craft where the payload unit is dimensioned and configured to accommodate passengers, increased passenger comfort.

The above summary does not include an exhaustive list of all aspects of the present invention. Indeed, the inventor contemplates that the invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

Various embodiments of the present invention are described below with reference to the drawings, wherein like designations denote like elements.

FIG. 13 is an exploded view of an annular wing of the embodiment of FIG. 10.

FIG. 14 is an exploded view of a suspension structure of the embodiment of FIG. 10.

FIG. 15 is an exploded view of a bearing of the embodiment of FIG. 10.

FIG. 16 is a perspective view of a propulsion subsystem in a lift unit of the embodiment of FIG. 10.

FIG. 17 is a perspective view of a flight control system in the lift unit of the embodiment of FIG. 10.

FIG. 21 is a perspective view of another embodiment of the invention in a vertical orientation.

FIG. 22 is a perspective view of the embodiment of FIG. 21 in a transitional orientation.

FIG. 23 is a perspective view of the embodiment of FIG. 21 in a horizontal orientation.

FIG. 24 is an alternative of the embodiment of FIG. 21 in a low observable configuration.

FIG. 37 is a perspective view of the embodiment of FIG. 33 with transition.

FIG. 38 is a perspective view of the embodiment of FIG. 33 with a horizontal orientation.

FIG. 41 is a perspective overview of another embodiment of the invention in a horizontal orientation.

FIG. 42 is a perspective overview of the embodiment of FIG. 41 with a landing on an elevated platform.

FIG. 66 is a perspective view of another embodiment of the invention during horizontal takeoff.

FIG. 67 is a perspective view of the embodiment of FIG. 66 in horizontal flight.

FIG. 76 is a perspective view of the embodiment of FIG. 74 during transition from ground to air travel configuration.

FIG. 77 is a perspective view of the embodiment of FIG. 74 with its lift unit in a vertical orientation.

FIG. 78 is a perspective view of the embodiment of FIG. 77 with its lift unit undergoing a transition from a vertical to a horizontal orientation.

FIG. 79 is a perspective view of the embodiment of FIG. 74 with its lift unit in a horizontal orientation.

DESCRIPTION OF PREFERRED EXEMPLARY EMBODIMENTS

A vertical lift flying craft according to various aspects of the present invention provides numerous benefits, which in particular embodiments include:

(a) more stability for payloads involved in ground observation;

(b) more comfort for passengers in the payload compartment;

(c) reduced weight penalty to the overall aircraft;

(d) mechanically simpler implementation;

(e) more reliable implementation;

(f) more efficient vertical flight performance;

(g) more efficient cruise performance; and (h) more stable transitions between vertical flight and horizontal flight.

Figure 1:
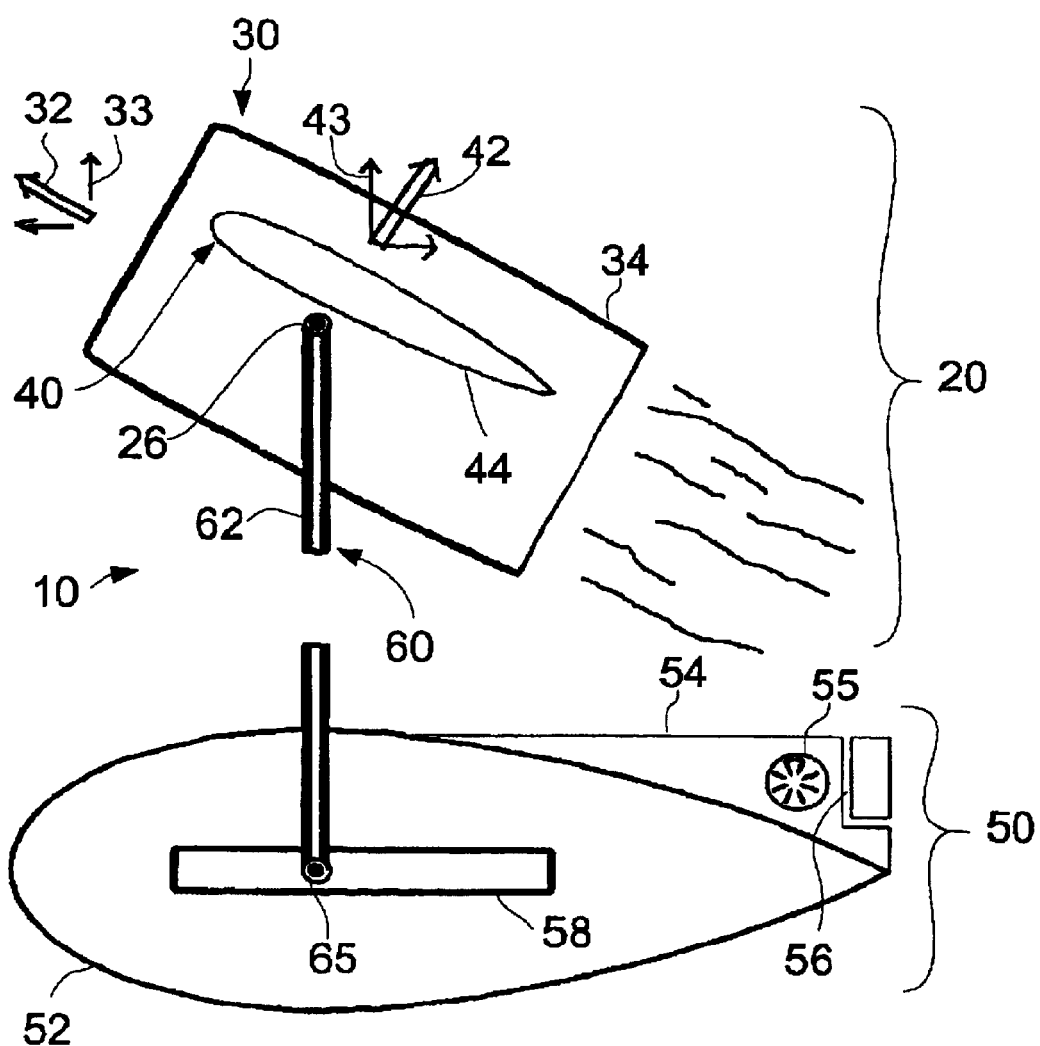
FIG. 1 is a side view of a generic embodiment of the invention.
Figure 2:
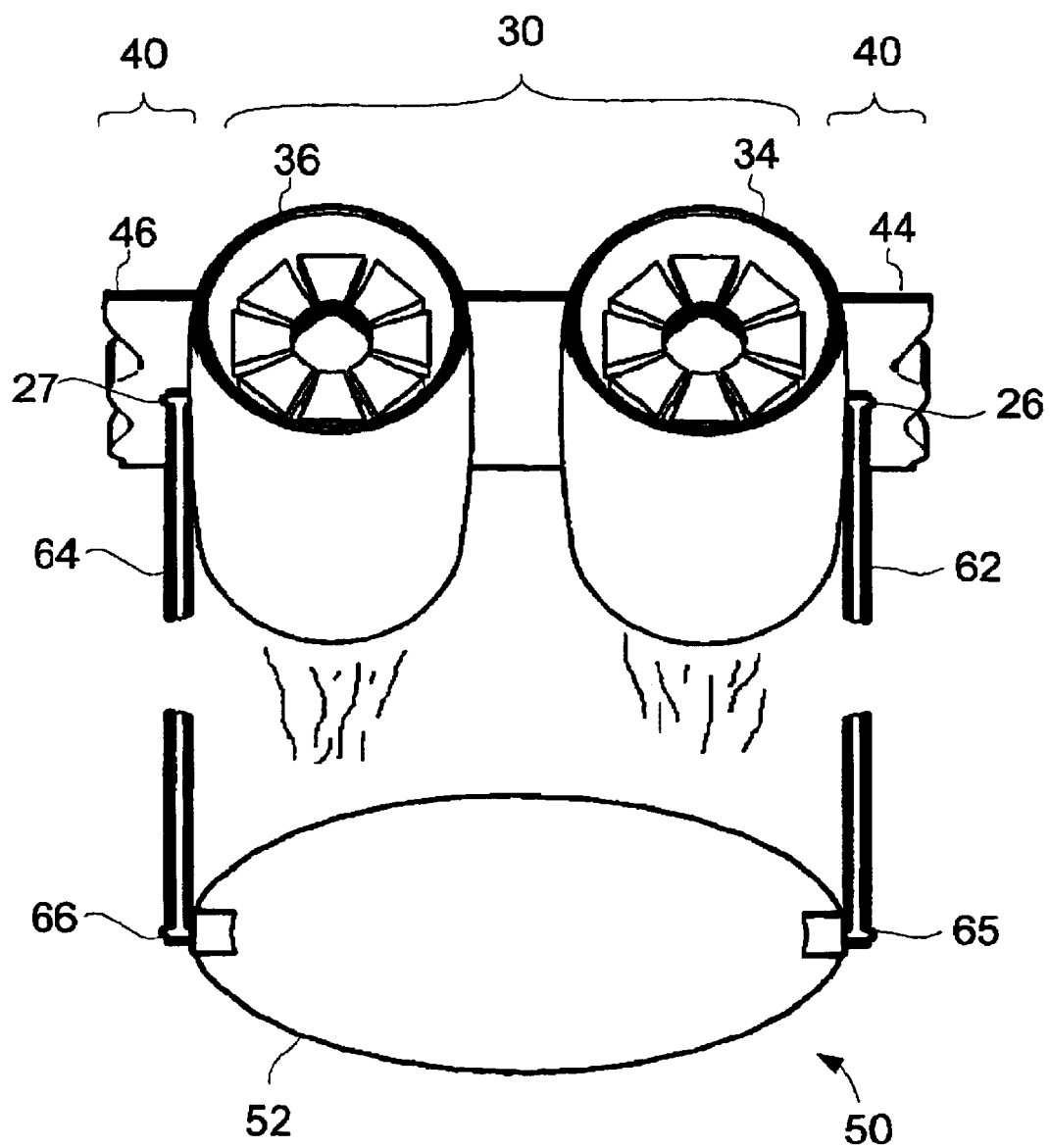
FIG. 2 is a front view of a generic embodiment of the invention.

Primary structural elements that are generally but not necessarily included in such a flying craft may be better understood with reference to an exemplary vertical lift flying craft 10 illustrated in FIGS. 1–2. Flying craft 10 includes a lift unit 20 and a payload unit 50 suspended from lift unit 20 by a suspension structure 60.

"Lift unit," "payload unit," "suspension structure," and other generic structural terms are defined below with respect to various exemplary embodiments. These structural elements need not be in the form described with reference to this example or the examples below; any suitable variations can be employed.

Lift unit 20 includes a thrusting system 30 and an aerodynamic lift system 40. Thrusting system 30 includes two propulsion subsystems 34 and 36 (FIG. 2), which rotate in opposite directions for gyrodynamic neutrality. Aerodynamic lift system 40 includes two fixed wings 44 and 46 connected to opposite sides of thrusting system 30.

Payload unit 50 includes a fuselage 52 and vertical stabilizer 54 having a fan-type thruster 55 and a rudder 56 for yaw adjustment during hover and horizontal flight, respectively. Payload unit 50 suspends from lift unit 20 by suspension structure 60, which includes a pair of tensile support members 62 and 64.

Flying craft 10 further includes a first set of bearings 26 and 27 pivotally coupling lift unit 10 to one end of suspension structure 60, and a second set of bearings 65 and 66 pivotally coupling payload unit 50 to an opposite end of suspension structure 60.

During flight, lift unit 20 develops force that includes an upward component to oppose gravitational force and suspend payload unit 50. A lift unit according to various aspects of the invention can develop such force from one or several sources, depending on the configuration of the lift unit and the particular mode of flight. As illustrated in FIG. 1, for example, thrusting system 30 and aerodynamic lift system 40 of lift unit 20 both develop upward-pointing forces during a transition from vertical to horizontal flight. These forces are represented by vectors 32 and 42, respectively.

Force from thrusting system 30, represented by vector 32, includes an upward component 33 because thrusting system 30 has a somewhat vertical pitch. Force from aerodynamic lift system 40, represented by vector 42, includes an upward component 43 due to lift from wings 44 and 46 (FIG. 2).

Advantageously, payload unit 50 imparts lateral stability to vertical lift flying craft 10 by suspending from lift unit 20 with rotation restricted about one axis. In this suspended configuration, payload 50 increases the moment of inertia in the plane of FIG. 2, i.e., the plane that includes parallel members 62 and 64 throughout their length. As a result, suspended payload 50 increases stability about the axis normal to that plane.

Advantageously, a suspension structure of a vertical lift flying craft according to various aspects of the invention pivotally couples to a lift unit, fixedly with respect to the two perpendicular axes. By permitting rotation about one axis and restricting rotation about the others, such a configuration permits movement of a suspended payload unit within a common plane with the lift unit while providing the payload unit from deviating laterally outside that plane. For example, bearings 26 and 27 permit movement of payload unit 50 within the plane of the side view of FIG. 1, but restrict such movement within the plane of FIG. 2 or the plane of the fixed wings 48, 46 when the aircraft is in horizontal flight. Thus, the plane of permissible movement is parallel to the direction of horizontal flight, and vertical lift flying craft 10 enjoys roll stability as a result.

FIG. 1 depicts suspension structure 60 with a gap between tensile support members 62, 64 to indicate that those members can be of any suitable length. In addition, tensile support members of a support structure according to various aspects of the invention can have controllably variable lengths. For example, a pilot of a flying craft according to various aspects of the invention can shorten one tensile member during vertical flight to offset the thrust vector of the flying craft's lift unit from the center of mass of the craft's payload unit. Thus, the pilot can produce a yawing moment without requiring other structure to develop the yawing moment, such as fan 55 of FIG. 1.

Figure 3:
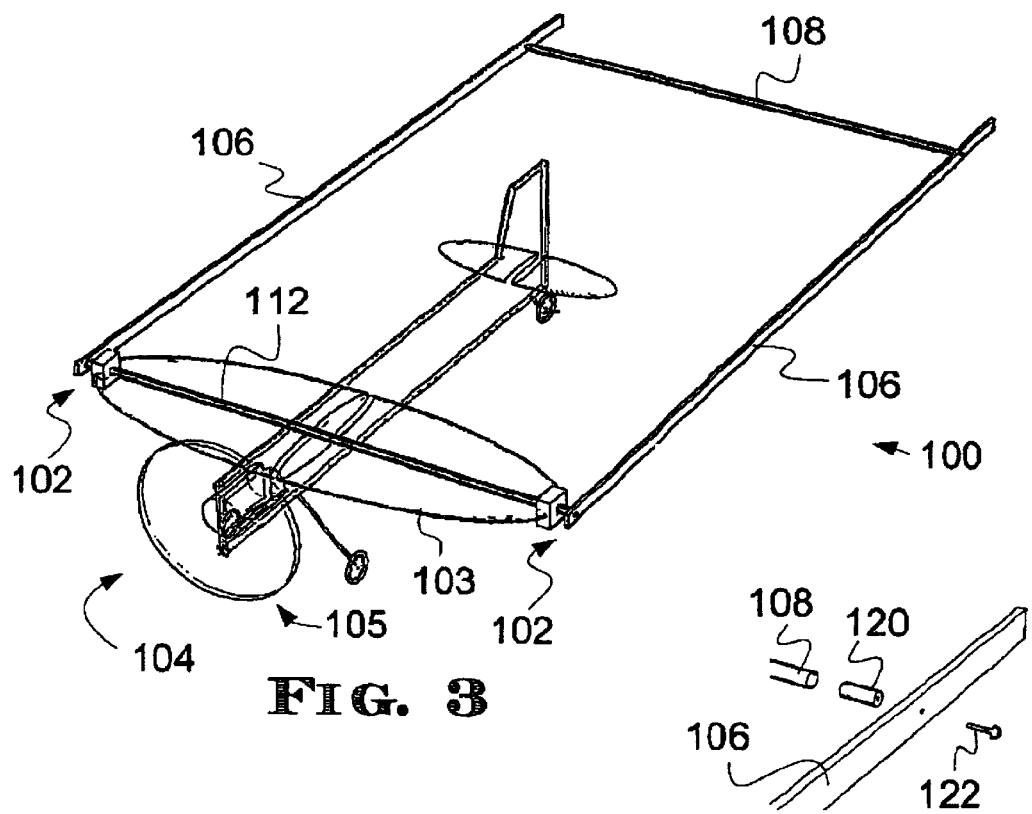
FIG. 3 is a perspective overview of a first embodiment of the invention.
Figure 81:
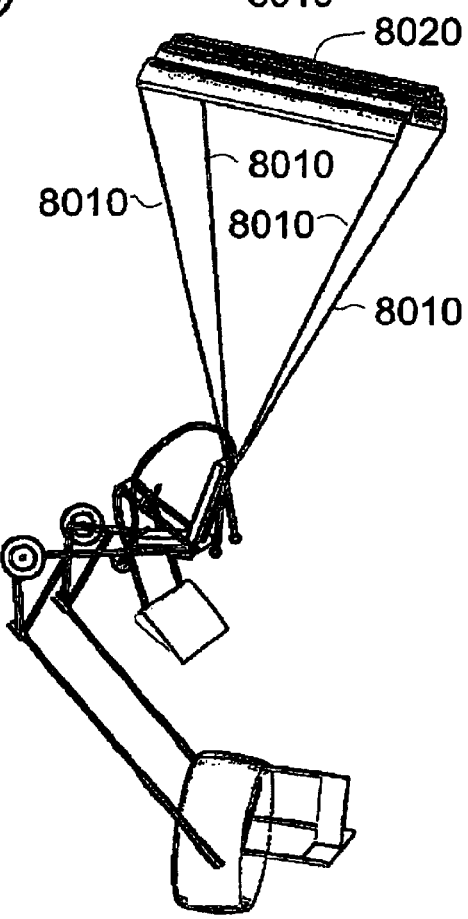

Numerous aspects of the invention may be better understood with additional reference to various exemplary embodiments of FIGS. 3–81. The examples provided in the discussion and drawings of these embodiments illustrate benefits of various aspects of the invention when such aspects are employed. However, certain aspects can provide benefits even when various other aspects are omitted. Thus, neither this nor any other example provided herein should be considered as limiting the scope of the invention in any way; that limiting function is reserved exclusively for the issued claims.

A first exemplary embodiment 100 of the invention includes a lifting unit 104 that employs, depending on the mode of flight, a fixed wing aerodynamic lift system 103 and a propeller thrusting system 105, which may be better understood with reference to FIGS. 3–8. A lift unit according to various aspects of the invention includes any heavier-than-air structure suitable for developing a force including an upward component without exerting a corresponding force on any external supporting structure or relying on aerostatic buoyancy. A lift unit can develop such a force from a suitably configured thrusting system, an aerodynamic lift system, or both.

A thrusting system or propulsion subsystem included in a thrusting system, according to various aspects of the invention, includes any structure suitable for developing a force primarily by accelerating fluid in an opposite direction In a thrust-based lifting unit, the force includes an upward component. The accelerated fluid can include exhaust gases (e.g., from a rocket motor) or ambient air (e.g., accelerated by a jet motor, fan, propeller, or turbine). A thrusting system can consist of a single propulsion device, e.g., a propeller, jet engine, etc., or can include one or more propulsion subsystems. For example, thrusting system 105 of embodiment 100 employs a propeller and provides lift when lift unit 104 is oriented vertically. In another embodiment, discussed in detail below with reference to FIG. 16, another thrusting system 1600 is comprised of a first torque producing propulsion subsystem 252 and a second torque producing propulsion subsystem 254.

An aerodynamic lift system according to various aspects of the invention includes any structure suitable for developing aerodynamic force (including an upward component) upon passing horizontally through a fluid medium, typically ambient air. For example, aerodynamic lift system 103 of embodiment 100 employs a single fixed wing and provides lift when lift unit 104 is moving horizontally at a suitable non-stalled speed and orientation. In an embodiment discussed below with reference to FIG. 13, another aerodynamic lift system 1300 includes an annular wing 210.

In exemplary embodiment 100, lift unit 104 is a remotely controlled model airplane having a profile fuselage. A preferred variation of such an airplane employs a 0.46 cubic inch displacement 10% nitromethane powered piston engine with a twelve inch diameter by five inch pitch propeller. Airplane 104 is a type of heavier-than-air thrust producing flying vehicle that is capable of transitioning between horizontal flight, sustained by lift from its wings, and vertical flight sustained solely by thrust generated by the engine with propeller.

A bearing according to various aspects of the invention includes any structure that permits axial rotation between two members while transferring lateral forces from one member to another. Typically, a bearing includes a first member that is (or includes) at least one shaft and a second member coupled to the first member such that the shaft is free to rotate but not move laterally with respect to the second member. As may be better understood with reference to FIG. 4, for example, exemplary embodiment 100 (FIG. 3) includes bearings 102 (FIG. 3) that are each comprised of a first (common) bearing member 112 and a second bearing member 110. In an exemplary fabrication method, bearing member 110 is fabricated from a block of wood by boring a hole in the block and pressing a ½-inch brass bearing race into the hole. Bearing member 110 is epoxied to each wingtip. Common bearing member 112 for each of bearings 102 is fabricated by cutting a ½-inch thin wall aluminum tube to a length just greater than the span of airplane 104, then polishing the aluminum tube with 000 grade steel wool. Airplane 104 is suitably modified to ensure that no obstructions exist between the ends of common bearing member 112.

The exemplary fabrication method continues with insertion of common bearing member 112 into one first bearing member 110 at one wing tip, passing it though the wing and fuselage, and finally passing it through bearing member 110 at the other wing tip, thereby forming a pair of bearings 102 where each end of bearing member 112 makes contact with second bearing member 110. Accordingly, bearing member 112 is rotatable with respect to bearing member 110 about a single rotational axis, and the pair of bearings 102 share a common rotational axis. A pair of bushings 114 can be fabricated from a ½-inch brass pipe fitting and pressed onto each end of bearing member 112. Thus bearing member 112 can be restricted in lateral movement relative to bearing member 110.

A suspension structure according to various aspects of the invention includes any structure suitable for suspending a payload unit from a lift unit. In the exemplary fabrication method, suspension structure 106 is fabricated from a pair of rails cut from ½-inch wide aluminum window-screen frame stock. A rubber plug 116, retained by a machine screw 118 at the first end of each rail of the suspension structure 106, is press-fit into bearing member 112, thereby forming a damped elastic mechanism joining each rail of the suspension structure 106 to each end of bearing member 112.

Figure 5:
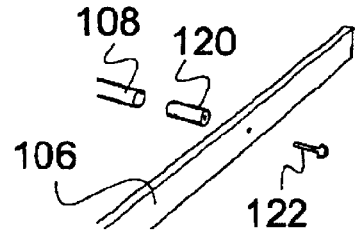
FIG. 5 is an exploded view of one end of suspension structure of the embodiment of FIG. 3.
Figure 4:
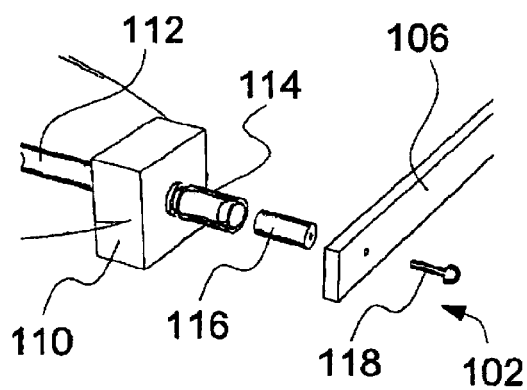
FIG. 4 is an exploded view of a wing tip of the embodiment of FIG. 3.

A payload unit according to various aspects of the invention includes any structure suitable for supporting a payload. A payload unit may or may not include a payload itself in addition to its payload support structure. For example, payload unit 108 of embodiment 100 can consist of a length of ½-inch thin-walled aluminum tubing that supports a payload to be provided. Alternatively, attached weights (not shown) can be attached as an actual payload and be considered part of payload unit 108. Rubber plug 120, retained by a second machine screw 122 at the second end of each rail of suspension structure 106, can be press-fit into each end of the payload unit 108. The result is a damped elastic mechanism joining each rail of the suspension structure 106 to the payload unit 108 (FIG. 5).

Figure 6:
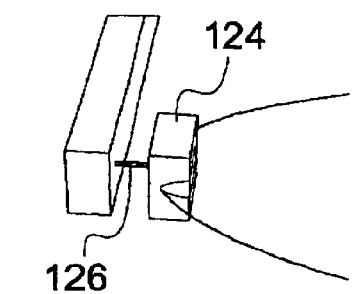
FIG. 6 is a perspective view of the embodiment of FIG. 3 with an alternative wing tip.

In a variation illustrated in FIG. 6, bearing member 110 is replaced with a simple wood block bearing member 124, and bearing member 112 is replaced with a bearing member 126 comprised of a short length of flexible cord. Suspension structure 106 and payload unit 108 are constructed as a single unit, as discussed above.

Figure 7:
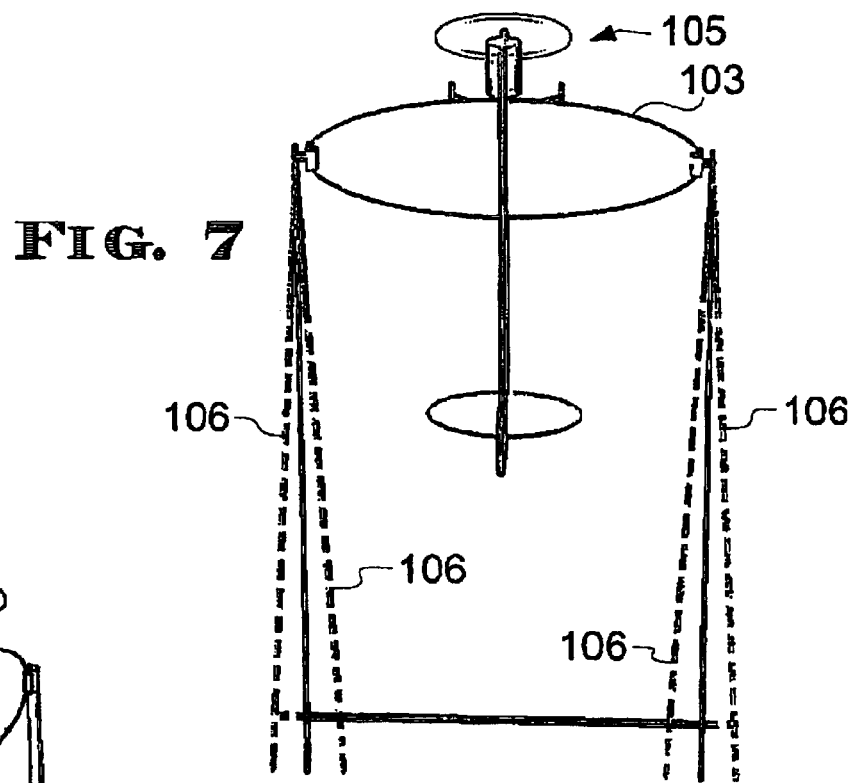
FIG. 7 is a view of the embodiment of FIG. 3 showing restricted lateral movement.
Figure 8:
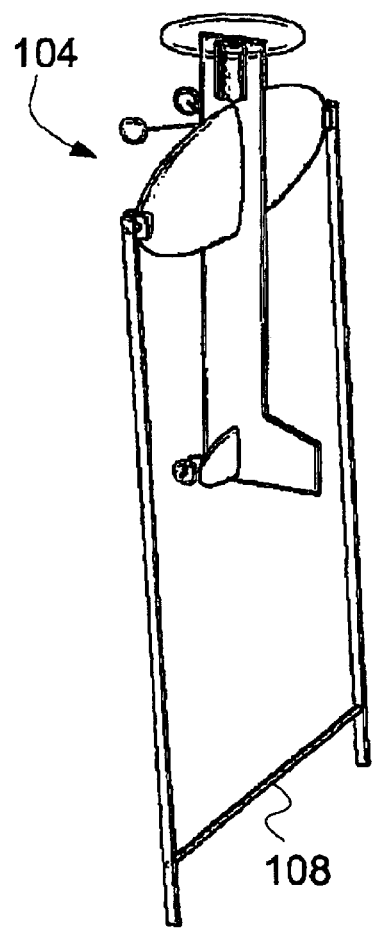
FIG. 8 is a perspective view of the embodiment of FIG. 3 in vertical flight.
Figure 9:
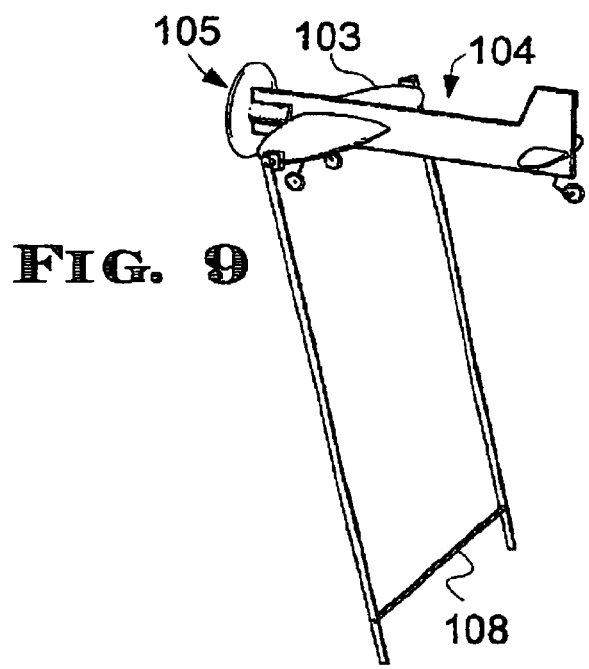
FIG. 9 is a perspective view of the embodiment of FIG. 3 in horizontal flight.

Accordingly, the second end of suspension structure 106 is free to move about the rotational axis defined by the centerline of bearing member 112 (or 126), but substantially restricted in movement parallel to the rotational axis. FIG. 7 depicts this restricted movement, showing the extent of side-to-side movement of the second end of suspension structure 106. The damped elastic mechanisms formed by the pair of first rubber plugs 116 and second rubber plugs 120 moderates the movement. Furthermore, payload unit 108 maintains a substantially fixed orientation with respect to the ground while fixed wing aircraft 104 transitions between a vertical orientation and a horizontal orientation (FIGS. 8–9).

Embodiment 100, fabricated in accordance with the exemplary method disclosed above or any suitable alternative, can be piloted using a conventional four-channel remote-control radio transmitter, performing conventional take-offs and landings on a paved runway. During takeoff, suspension structure 106 and payload unit 108 drag behind lift unit 104 (FIG. 3). During landing, suspension structure 106 first touches the runway and then drags behind while lift system 104 lowers to touchdown. As stated above, lift system 104 is a heavier-than-air thrust-producing flying vehicle, capable of transitioning between horizontal flight sustained by lift from its wings and vertical flight sustained solely by thrust generated by the engine-driven propeller.

While airborne, fixed-wing embodiment 100 can implement a method for transporting payload unit 108 that comprises the following acts: flying lift unit 104 vertically (or in hover) with payload unit 108 suspended underneath; transitioning lift unit 104 between a vertical orientation (FIG. 8) and a horizontal orientation (FIG. 9) with respect to the ground; flying horizontally with payload unit 108 suspended beneath lift unit 104; and freely pivoting payload unit 108 about the axis passing through pair of bearings 102 while substantially restricting pivotal movement about all other vehicle axes. Accordingly, the payload maintains a substantially fixed orientation with respect to the ground while the vehicle transitions between a vertical orientation and a horizontal orientation.

The force of gravity tends to position payload unit 108 beneath lift unit 104, which lowers the center of gravity and increases pendular stability. This behavior conforms to accepted aircraft design theory, which holds that pendular stability (also known as lateral stability or roll stability) increases for "high wing" airplanes having a low center of gravity. Contrary to some conventional teachings, enhancement of pitch stability of lift unit 104 is not primarily due to the addition of suspension structure 106 and payload unit 108. Instead, the mass of payload unit 108 is believed to behave in pitch like a point mass at the axis of rotation. Pitch stability and control of lift unit 104 are thus unaffected by the addition of suspension structure 106 and payload unit 108, while roll or pendular stability in horizontal flight (FIG. 9) and yaw stability in vertical flight (FIG. 8) increase.

The method further includes mode-rating the restricted pivotal movement of payload unit 108 about other vehicle axes than the one desired by permitting initial movement that is restrained by elastic structure. Such elastic damping can provide the flying craft improved yaw control. When a force laterally displaces exemplary suspension structure 106 in vertical flight, as shown in FIG. 7, mechanical work is performed on the pair of first rubber plugs 116 and the pair of second rubber plugs 120. This work causes pairs of plugs 116 and 120 to become contorted while storing energy. In this displaced configuration, thrust from the engine of airplane 104 is offset from the payload center of gravity thereby creating a yawing moment.

Removing the cause of the lateral displacement allows pairs of plugs 116 and 120 to restore their shape. This restoration process damps the movement by dissipating the stored energy while elastically restoring the suspension structure 106 to its original position. As discussed below with reference to FIG. 20, this damped elastic process improves the effectiveness of yawing moments, which embodiment 100 develops by deflecting its yaw control surface in vertical flight.

Figure 10:
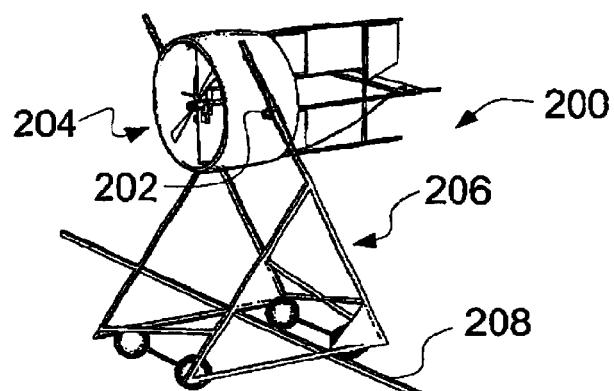
FIG. 10 is a perspective overview of another embodiment of the invention, in horizontal orientation.
Figure 11:
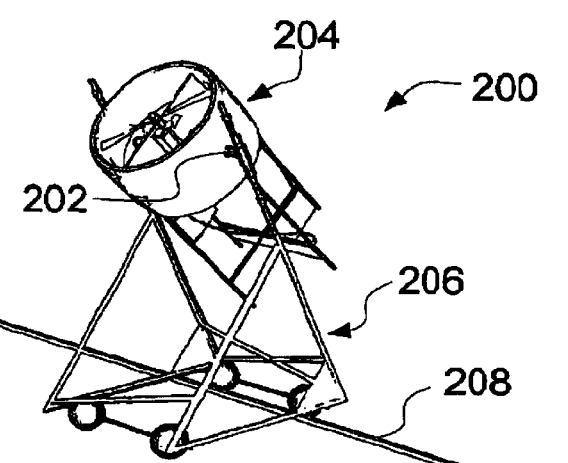
FIG. 11 is a perspective overview of the embodiment of FIG. 10 in a transitional orientation.
Figure 12:
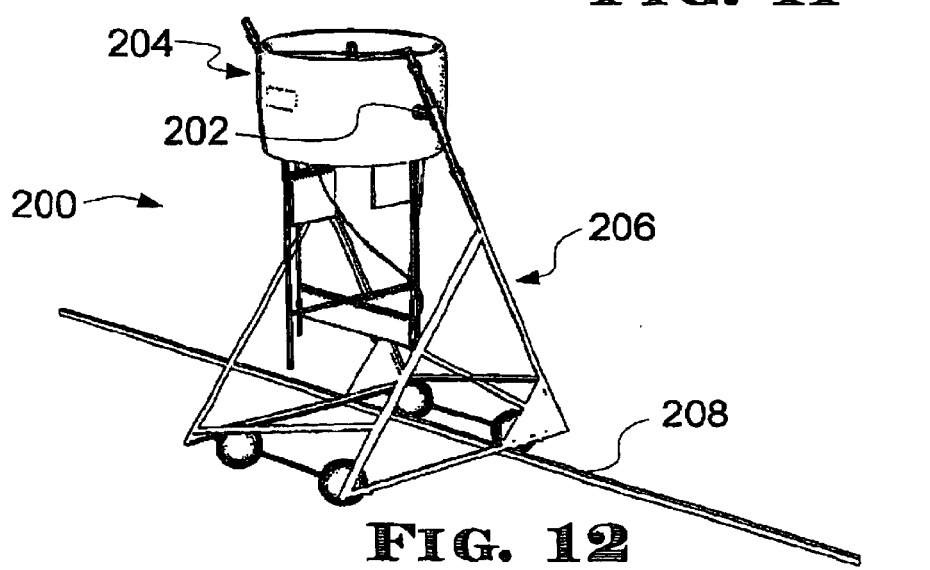
FIG. 12 is a perspective overview of the embodiment of FIG. 10 in a vertical orientation.
Figure 18:
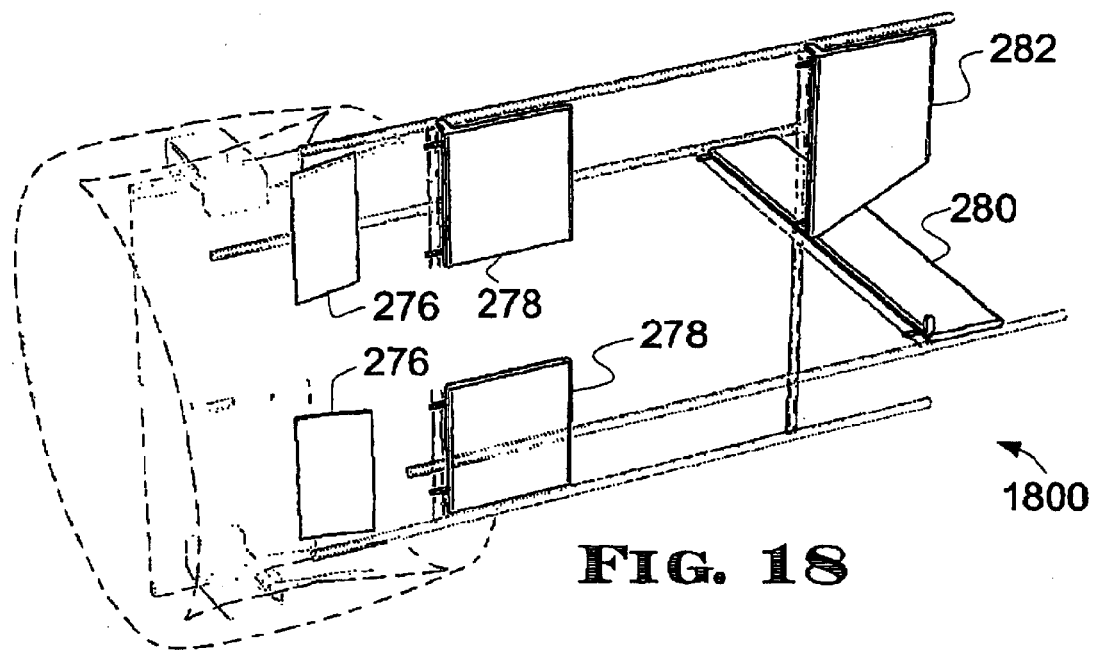
FIG. 18 is a perspective view of aerodynamic control surfaces in the lift unit of the embodiment of FIG. 10.

Another exemplary embodiment 200 of the invention, which may be better understood with reference to FIGS. 10–12, is comprised of a pair of bearings 202 coupled to both a lift unit 204 and a suspension structure 206 having a payload unit 208. Annular-wing lift unit 204 is comprised of the following subsystems: an aerodynamic lift system 1300 (FIG. 13) that includes an annular wing 210; a thrusting system 1600 (FIG. 16); a flight control system 1700 (FIG. 17); and an aerodynamic control system 1800 (FIG. 18).

Exemplary aerodynamic lift system 1300 of FIG. 13 includes an annular wing 210 made of a polystyrene foam core covered with epoxy resin coated (i.e., impregnated) fiberglass cloth FIG. 13 also illustrates a pair of fiberglass access panels 212. A sandwiched matrix of birch plywood and sheet aluminum, held together by epoxy resin and brass wood screws, forms a pair of engine mounts 216, which are coupled to annular wing 210 and reinforced with fiberglass cloth and epoxy resin. A tail truss structure 214 can be formed from several ¼-inch diameter carbon graphite tubes bound together with carbon graphite string and epoxy resin at each joint. Tail truss structure 214 can be mounted into annular wing 210 and reinforced with fiberglass cloth and epoxy resin.

In exemplary embodiment 200, lift system 204 employs both an aerodynamic lifting system 1300 that functions primarily when lift unit 204 is in horizontal flight, and a thrusting system 1600 that provides lift primarily during stationary or slow-moving ascension or hover flight. Exemplary thrusting system 1600 of FIG. 16 is comprised of a first torque-producing propulsion subsystem 252 and a second torque-producing propulsion subsystem 254, wherein subsystem 252 is positioned in front of and rotates counter to subsystem 254. The two propulsion subsystems 252 and 254 are, in a preferred variation, counter-rotating 0.46 cubic inch displacement 30% nitromethane-powered piston engines. A 12 inch by 6 inch normal or tractor propeller 256 is mounted onto propulsion subsystem 252, and a 12 inch by 6 inch pusher propeller 258 is mounted onto propulsion subsystem 254. Thrusting system 1600 further includes a pair of two-ounce fuel tanks 260, one for each propulsion subsystem, and a glow plug extender 262 attached to propulsion subsystem 252 and extending through annular wing 210. Both propulsion subsystems 252 and 254 are mounted to pair of engine mounts 216 using screws and nuts. The pair of two-ounce fuel tanks 260 are mounted to engine mounts 216 using eye screws and rubber bands. Glow plug extender 262 is epoxied into annular wing 210.

Exemplary flight control system 1700 of FIG. 17 is comprised of four flight control actuators 264 embedded into the polystyrene form core of annular wing 210. A throttle control actuator 266 is mounted beneath propulsion subsystem 254. In a remote-controlled variation of embodiment 200, a four-channel radio receiver 268 having an attached radio battery 270 is mounted to engine mounts 216 using eye screws and rubber bands, and radio receiver 268 is electrically connected through wires to flight control actuators 264 and throttle control actuator 266. Both a piezo-gyro pitch rate stabilizer 272 and a piezo-gyro yaw rate stabilizer 274 are mounted to engine mounts 216 and electrically connected by wires between radio receiver 268 and flight control actuators 264. Throttle control actuator 266 is mechanically linked by metal push rods to both propulsion subsystem 252 and subsystem 254.

Exemplary aerodynamic control system 1800 of FIG. 18 is comprised of fixed stators 276, a pair of slab roll control surfaces 278, a slab pitch control surface 280, and a slab yaw control surface 282. Fixed stators 276 are cut from sheet aluminum and mounted to engine mounts 214 with brass wood screws. Other control surfaces 278, 280, and 282 can have a balsa wood frame covered by a plastic heat-shrink film and can be mounted to tail truss structure 216 with pin-point hinges. Metal push rods connect roll control surfaces 278 to flight control actuators 264. Plastic push rods connect pitch control surface 280 and yaw control surface 282 to flight control actuators 264.

Each of bearings 202 (FIGS. 10–12) includes a first bearing member 218 and a second bearing member 220 (FIG. 15). Bearing member 218 is fabricated from a ½-inch threaded polyvinyl chloride (PVC) cap by boring a small hole through the end of the PVC cap. Bearing member 220 is fabricated from a ½-inch PVC straight connector by boring a small hole through the side of the PVC connector. Bearing member 218 and bearing member 220 are joined by a flat head machine screw 222 and a lock nut 224. As a result, bearing member 220 is rotatable with respect to bearing member 218 about a single rotational axis defined by the centerline of machine screw 222.

In exemplary embodiment 200, bearings 202 are coupled to the exterior of lift unit 204 along an axis that (1) is parallel to pitch control surface 280 and (2) passes through the center of gravity of the upper part of vehicle, 204 including subsystems 1300, 1600, 1800 (FIG. 13). An exemplary method of coupling includes the following processes: creating a fiberglass hard point at the appropriate location on the side of lift unit 204; boring a small hole into the hard point; boring a small hole into a ½-inch PVC threaded plug 228; and mounting plug 228 onto the hard point using a round head machine screw 226. After completing these steps on both sides of lift unit 204, a pair of shims 230 are shaped from flat PVC stock and placed between each plug 228 and annular wing 210 to align the plugs with the axis passing through the lift unit's center of gravity. Bearing members 218 are then screwed onto plugs 228. Accordingly, bearings 202 share a common rotational axis that is parallel to pitch control surface 280 and passes through the center of gravity of lift unit 204.

As may be better understood with reference to FIGS. 14–15, exemplary suspension structure 206 (FIGS. 10–12) is comprised of a pair of mechanisms 232 providing elastic damping between bearings 202 and support frame 244. Each damped elastic mechanism 232 includes a support shaft 234 fabricated from a length of ½-inch thin-wall aluminum tube polished with 000 grade steel wool, and two damped sliders 236 fabricated from lengths of ½-inch PVC pipe by reaming and polishing the inside of the PVC pipe whereby damped sliders 236 moved smoothly but with some friction over support shaft 234. During a preferred fabrication process, damped sliders 236 are inserted into each end of bearing member 220 (FIG. 15). Then support shaft 234 is inserted through damped sliders 236. Damped elastic mechanism 232 further includes a ½-inch inside diameter elastic spring 238 placed on support shaft 234 above bearing 202. An upper stop 242 and a lower stop 240 are cut from ½ inch PVC pipe and press-fit onto either end of support shaft 234. Thus elastic spring 238 and bearing 202 having damped sliders 236 are retained on support shaft 234.

Figure 20:
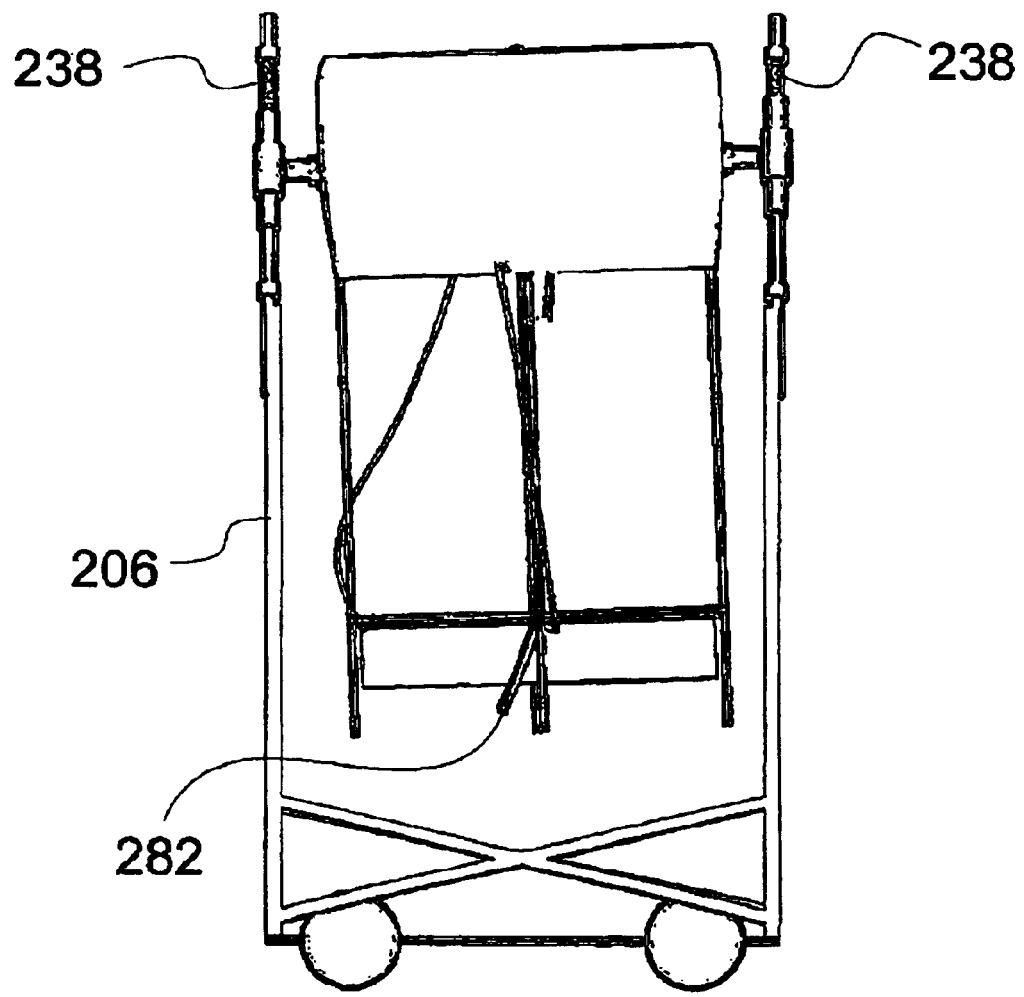
FIG. 20 is a view of the embodiment of FIG. 10 illustrating restricted lateral movement.

In this exemplary configuration, support frame 244 at the second end of suspension structure 206 is free to move about the rotational axis defined by the centerline of machine screws 222 but substantially restricted in movement parallel to the rotational axis. FIGS. 10–12 depict this movement about the rotational axis, and FIG. 20 depicts the restricted movement, showing both elastic springs 238, with one having more compression that the other. Damped elastic mechanism 232 moderates the movement by storing and releasing energy in elastic springs 238 while dissipating energy through friction between support shaft 234 and damped sliders 236.

Suspension structure 206 is further comprised of a pair of axles 246 cut from lengths of ¼-inch carbon graphite tubes sheathed in ¼-inch thin-wall aluminum tube (FIG. 14). Four wheels 250 can be fabricated from 3-inch plastic "wiffle" balls by boring ⅜-inch holes through each end of each ball and mounting the balls onto axles 246. Support shaft 234, axles 246, and a pair of rudders 248 fabricated from "oak-tag" cardboard are mounted to support frame 244. Finally, payload unit 208 (FIGS. 10–12) can be fabricated from an 8-foot length of ½-inch angle aluminum and mounted onto support frame 244 at the lower end of suspension structure 206. Thus payload unit 208 maintains a substantially fixed orientation with respect to the ground while lift unit 204 transitions between a vertical orientation and a horizontal orientation, as depicted in FIGS. 10–12.

Figure 19:
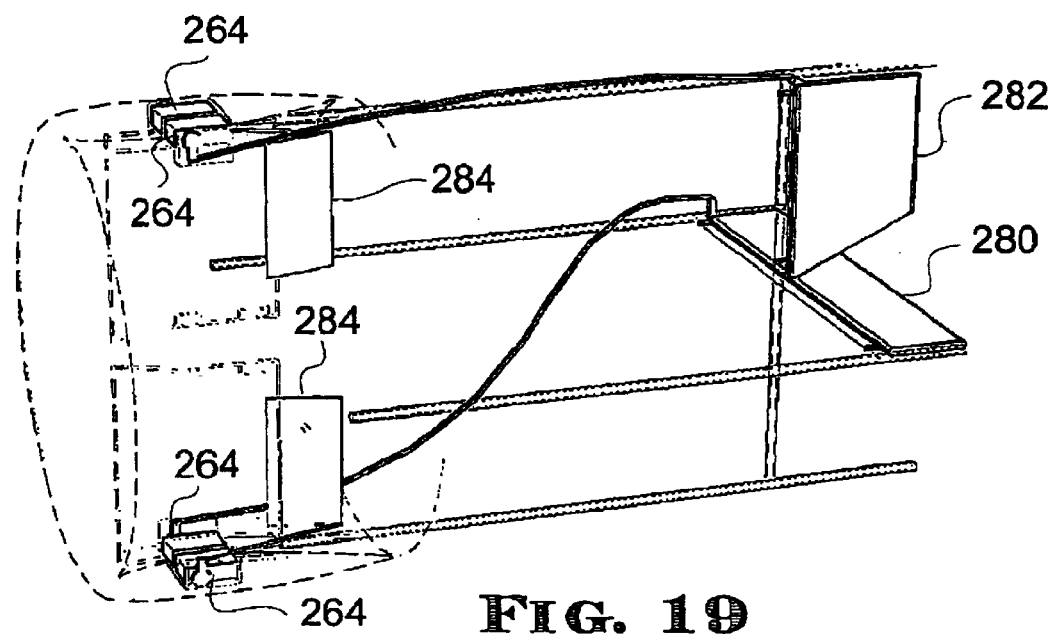
FIG. 19 is a perspective view of alternative aerodynamic control surfaces of the embodiment of FIG. 10.

In a variation of embodiment 200 illustrated in FIG. 19, the pair of roll control surfaces 278 (FIG. 18) is omitted. In such a variation, fixed stators 276 are replaced by variable pitch stators 284 formed from sheets of polyethylene and mounted onto engine mounts 216 with brass wood screws. Metal push rods connect variable pitch stators 284 to flight control actuators 264.

Embodiment 200, fabricated in accordance with the exemplary method disclosed above or any suitable alternative, can be piloted using a conventional four-channel remote-control radio transmitter, performing vertical take-offs and landings from flat pavement. When suitably configured, propulsion subsystems 252 and 256 (which include respective propellers 254 and 258 as illustrated in FIG. 16) produce sufficient thrust to elevate lift unit 204 out of ground effect. Horizontal flight, against the force of gravity, is sustained largely from the function of annular wing 210 in aerodynamic lift system 1300 (FIG. 13).

Force developed by aerodynamic lift system 1300 includes an upward component, which here is conventional lift produced by annular wing 210 in a free stream of air. The airstream is enhanced by energized airflow that is produced by propulsion subsystems 252 and 256. Pitch control surface 280, in combination with the energized airflow from torque-producing propulsion subsystems 252 and 256 having propellers 254 and 258, provides sufficient pitch authority to transition lift unit 204 between vertical flight and horizontal flight. Thus, lift unit 204 is a heavier-than-air, thrust-producing vehicle having the ability to transition between vertical flight and horizontal flight.

Embodiment 200 provides a method for transporting payload unit 208 that includes the following acts: flying lift unit 204 vertically (or in hover) with payload unit 208 suspended underneath; transitioning lift unit 204 between a vertical orientation (FIG. 12) and a horizontal orientation (FIG. 10) with respect to the ground; flying horizontally with payload unit 208 suspended beneath lift unit 204; and freely pivoting payload unit 208 about the axis passing through pair of bearings 202 while substantially restricting pivotal movement about all other vehicle axes.

As in the flying of embodiment 100, the force of gravity can be expected to position payload unit 208 of embodiment 200 beneath lift unit 204. This configuration lowers the center of gravity and increases pendular stability. As with embodiment 100, pitch stability and control of lift unit 204 are not significantly affected by the addition of suspension structure 206 and payload unit 208. However, roll or pendular stability in horizontal flight (FIG. 10) and yaw stability in vertical flight (FIG. 12) increase.

The method for transporting payload unit 208 can further include a damped elastic process for moderating the pivotal movement of payload unit 208 about the other vehicle axes, whereby the aircraft has improved yaw control. In vertical flight, yaw input causes thrust from propulsion subsystems 252 and 256 to be offset from the center of gravity of payload unit 208, which causes a yawing moment. As illustrated in FIG. 20, for example, one elastic spring 238 is compressed while the other is expanded, and thrust from subsystems 252 and 256 is offset to the right (referencing the viewpoint of FIG. 20) of the center of gravity of payload unit 208.

Yaw control is used to direct the thrust. Damping the connection made by suspension structure 206 between lift unit 204 and payload unit 208 facilitates this displacement of thrust off-center from the payload center of gravity. Without such damping, yaw input produces only a small lateral force at yaw control surface 282 that yields little effect on aircraft control. In embodiment 200, the yaw control surface is actually very near the total aircraft center of gravity (which is different than the payload center of gravity) during hovering flight. Thus, the advantageous displacement of the thrust vector provided by a damped elastic process and structure according to various aspects of the invention is critical to producing a yawing moment in embodiment 200.

Yaw stability is a dynamic process, so a description of it begins with an initial state and continues with each intermediate step until a final state is reached. As an example, consider a craft hovering in calm air in an initial state. In the example, a side gust from the left displaces the craft towards the right, while also producing at least three moments. The first is a rolling moment of the entire craft, caused by the asymmetry of a vertical tail included in the craft of the example, whereby the craft rolls towards the gust. The second is a yawing moment of the craft's lift unit, which results from the distance between the vertical tail and the center of gravity of the lift unit, whereby the lift unit rotates relative to the payload unit. The third moment is a yawing moment of the entire craft, caused by the displaced thrust vector from the rotated lift unit, whereby the craft yaws towards the gust (similar to yaw control as discussed above, but without requiring deflection of the tail.) These three moments in combination cause the craft to rotate into the wind and begin transitioning towards horizontal flight. As the craft transitions, the pilot of the example craft has the option of either continuing the transition or decelerating into hover again, but this time facing towards the gust. Like all dynamically stable aircraft, the example craft "weathervanes" into the wind.

In the method discussed above for transporting payload unit 208 or any suitable variation, a thrusting system according to various aspects of the invention can act in a gyrodynamically neutral fashion while converting fuel (or any other suitable source of energy e.g., a battery) into thrust. With such neutrality, an aircraft has improved pitch and yaw control in vertical flight. Gyrodynamic theory predicts that a gyroscope, when acted upon by a moment, will move through an angular displacement at a right angle to the applied moment. One method to neutralize this effect is to place a second gyroscope on the same axis as the first gyroscope, with the gyroscopes spinning at the same rate in opposite directions. By this method, the operation of propulsion subsystem 252 (having tractor propeller 256), positioned in front of and rotating counter to propulsion subsystem 254 (having pusher propeller 258) is for practical purposes gyrodynamically neutral (FIG. 16). Unlike a gyroscopic thruster comprised of a single engine having a propeller, a gyrodynamically neutral system does not distort the effects of pitching and yawing moments. Freedom from such distortion improves pitch and yaw control.

Another exemplary embodiment 300, particularly suited for use as an unmanned aerial vehicle, is shown in FIGS. 21–32. Embodiment 300 employs a pair of bearings 302 coupled to a lift unit 304 and a suspension structure 306 having a payload unit 308 (FIGS. 21–23). Except as discussed below, embodiment 300 can employ structure corresponding to embodiment 200.

Figure 25:
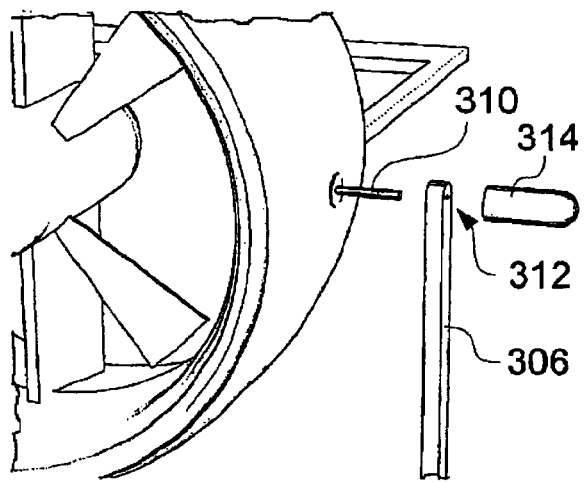
FIG. 25 is an exploded view of a bearing of the embodiment of FIG. 21.

Each bearing 302 is comprised of a first bearing member 310 and a second bearing member 312 (FIG. 25). Each first bearing member 310 is a threaded post extending from either side of lift unit 304 along a common lateral axis. Bearing member 312 is formed by boring a hole through the first end of suspension structure 306 and sliding the hole over bearing member 310. Accordingly, bearing member 312 is rotatable with respect to bearing member 310 about a single rotational axis, and pair of bearings 302 share a common rotational axis. A slidable cap 314 having a threaded hole is screwed onto bearing member 110, restricting bearing member 112 in movement with respect to bearing member 110. The pair of slidable caps 312 move smoothly within the rails of a ground-based launching platform 316, as shown in sequences of FIGS. 29–32.

Figure 27:
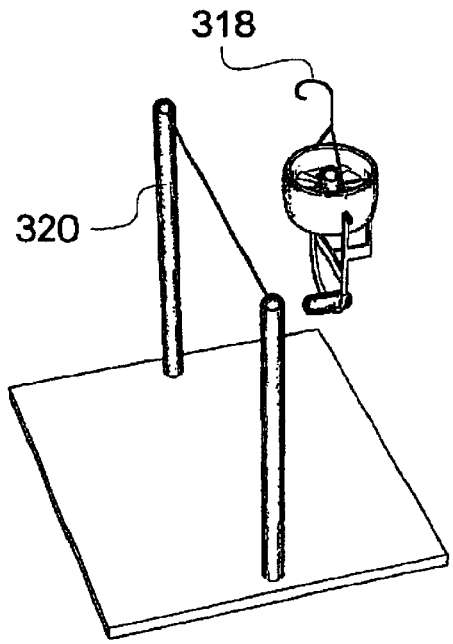
FIG. 27 is a perspective view of the embodiment of FIG. 21 during a recovery approach phase of flight.
Figure 28:
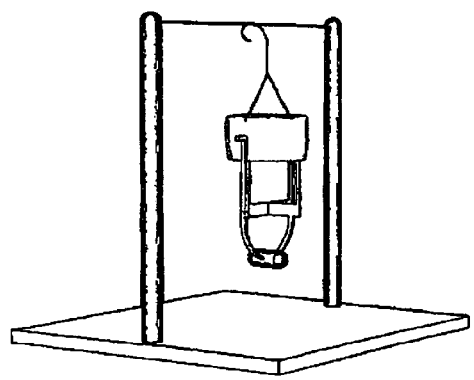
FIG. 28 is a perspective view of the embodiment of FIG. 21 after recovery.
Figure 29:
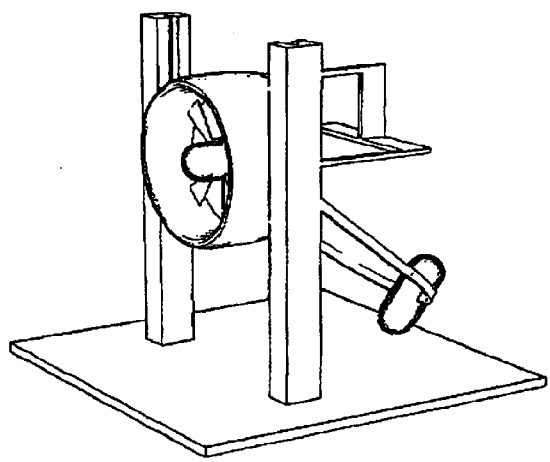
FIG. 29 is a perspective view of the embodiment of FIG. 21 with a launching platform according to various aspects of the invention.
Figure 30:
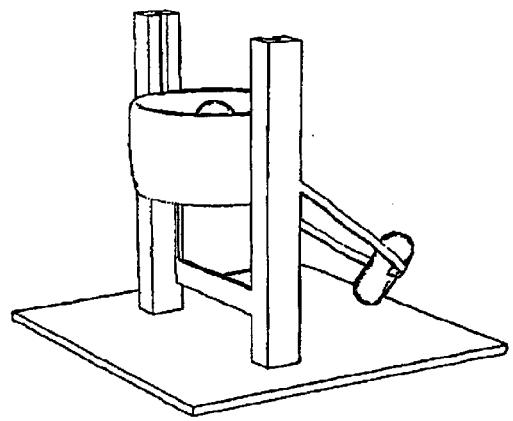
FIGS. 30 to 32 are perspective views of the embodiment of FIG. 21 during an exemplary launch sequence.
Figure 31:
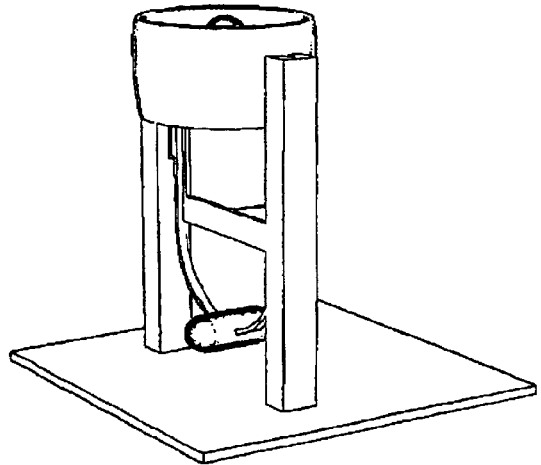
Figure 32:
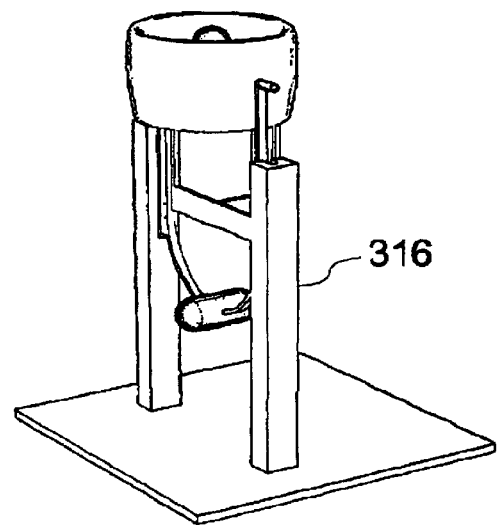
Figure 33:
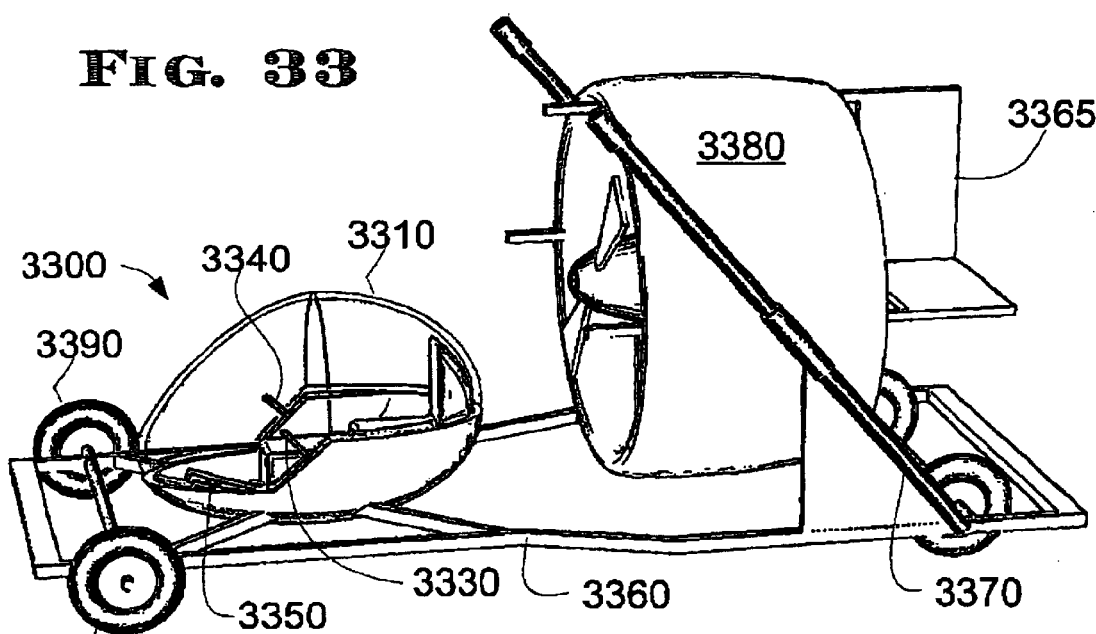
FIG. 33 is a perspective overview of another embodiment of the invention with ground configuration.
Figure 34:
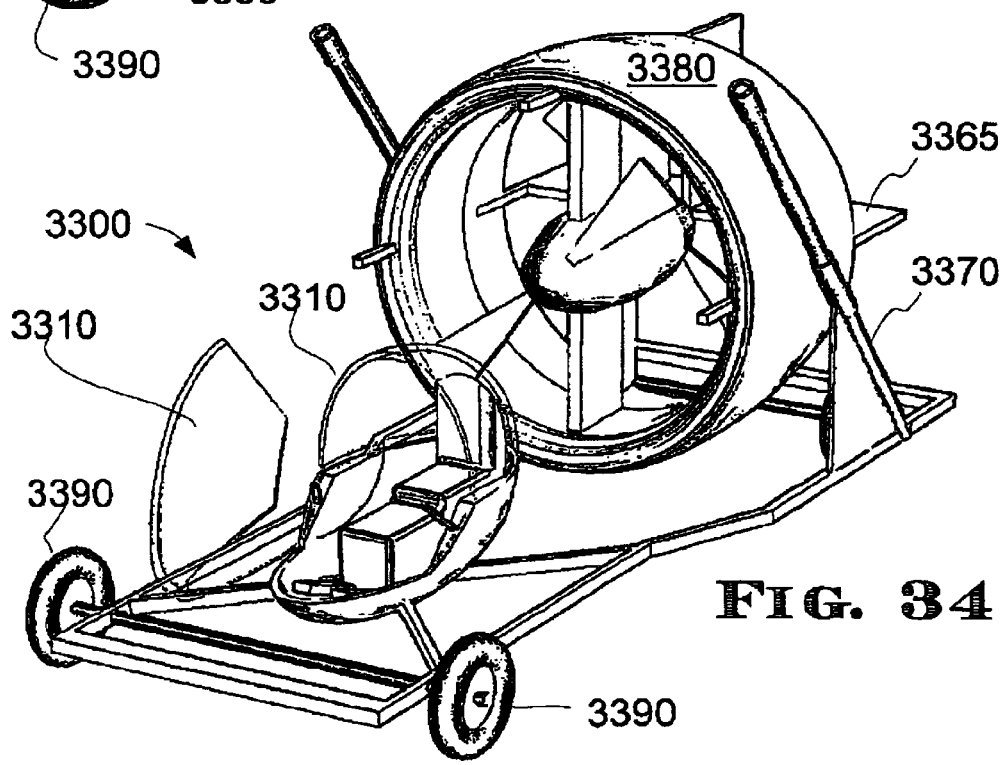
FIG. 34 is a perspective overview of the embodiment of FIG. 33 with open canopy.
Figure 35:
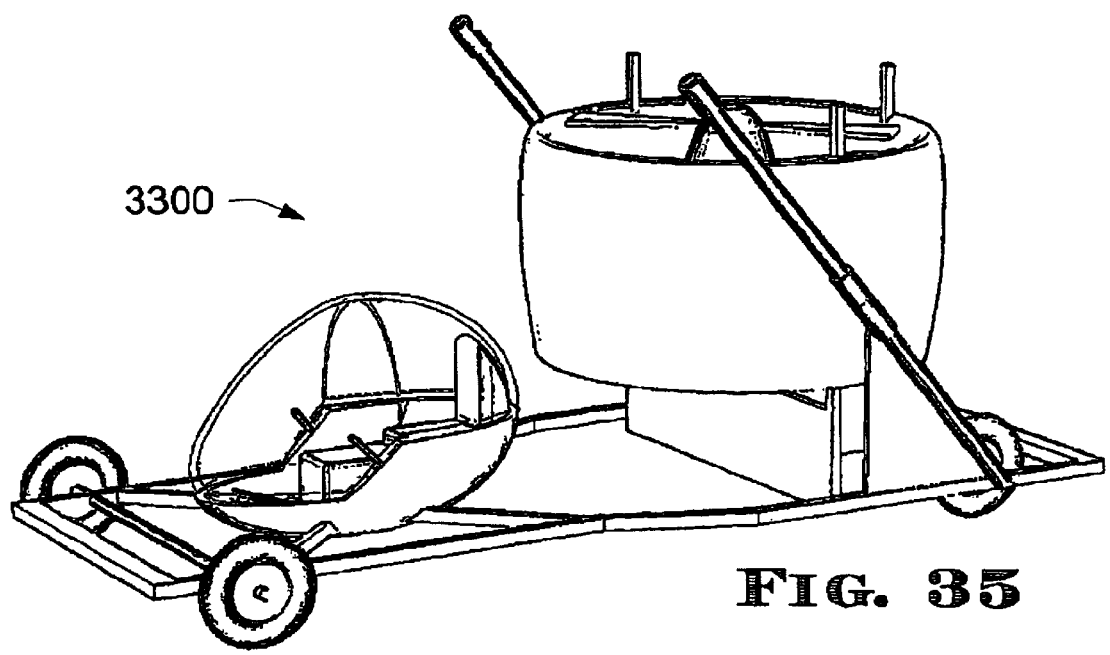
FIG. 35 is a perspective view of the embodiment of FIG. 33 with transition from ground to air configuration.

The overall design of lift unit 304 is similar to lift unit 204 of embodiment 200, with a few main differences. Lift unit 304 includes a thrust-producing system 2300 that has a single engine connected to a counter-rotating propeller subsystem. This arrangement simplifies operation and provides a smaller acoustic signature and radar signature. In addition, lift unit 304 includes an arresting hook 318 for recovery on a ground-based arresting platform 320, the operation of which is illustrated in FIGS. 27–28.

Figure 26:
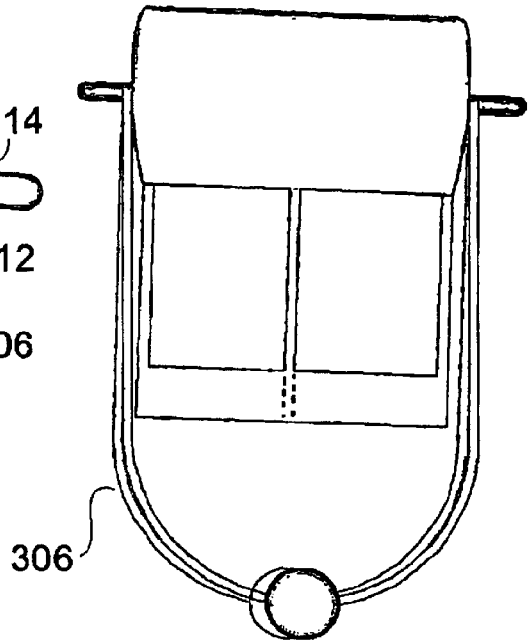
FIG. 26 is a view of the embodiment of FIG. 21 showing restricted lateral movement.

Suspension structure 306 of exemplary embodiment 300 is formed from a single piece of semi-elastic material having sufficient flexibility that the pair of second bearing members 312 can be spread apart from one another and slipped over the pair of first bearing members 310. The material of suspension structure 306 has sufficient inherent damping to prevent harmonic oscillations in all modes of operation. The inherent material properties of suspension structure 306 provides a damped elastic mechanism to moderate movement of suspension structure 306 parallel to the rotational axis, as illustrated in FIG. 26. Thus the aircraft has improved yaw control in vertical flight.

A variation of embodiment 300 (FIG. 24) has a facetted annular wing with a canted tail to further reduce the radar signature.

Embodiment 300 provides transport of payload unit 308 using a gyrodynamically neutral system for converting fuel to thrust with a single engine having a balanced counter-rotating propulsion subsystem. A launching process for launching embodiment 300 includes guiding lift unit 304 along a pair of rails on ground based-launching system 316 (FIGS. 29–32). A recovery process includes hooking lift unit 304 onto ground-based arresting platform 320 (FIGS. 27–28). An alternative recovery process can include catching the aircraft in a net.

Another exemplary embodiment 3300 that can travel on the ground may be better understood with reference to FIGS. 33–40. The scale of embodiment 3300 is larger than that of embodiment 200 to accommodate a pilot and a passenger in a payload unit 3310. A pilot and passenger can enter payload unit 3310 and close its canopy 3320 (FIG. 34), thereby becoming payload included in payload unit 3310. In a variation, the fuselage that includes canopy 3320 can be removable from the rest of payload unit 3310, leaving only a payload support structure coupled to suspension structure 3370 of embodiment 3300. In such a variation, the fuselage itself can also be considered payload that is supported by payload unit 3310, which then consists only of the remaining support structure. In other words, the variation includes a payload unit supporting (rather than incorporating) the fuselage.

As depicted in FIGS. 33–40, payload unit 3310 includes a left-side stick controller 3330 for throttle and roll control, and a right-side stick controller 3340 for pitch and yaw control. Payload unit 3310 can be considered to include a payload (a pilot) or merely support a provided payload. Differential pedals and toe pedals 3350 provide steering and brake control, in a manner similar to conventional airplanes. Payload support structure 3360 of payload unit 3310 includes telescoping support shafts of suspension structure 3370 with internal pneumatic springs and dampers (not shown). The tail truss structure 3365 slides into the annular wing 3380 for efficient ground operation. The annular-wing vehicle and the suspension structure can include emergency parachutes.

Figure 36:
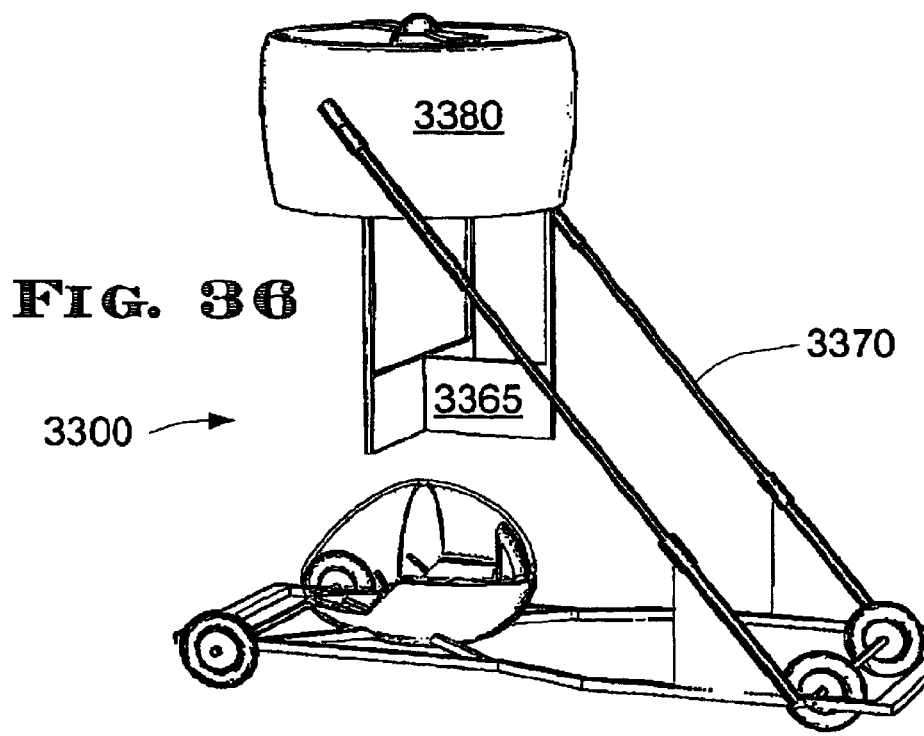
FIG. 36 is a perspective view of the embodiment of FIG. 33 in a vertical orientation.
Figure 39:
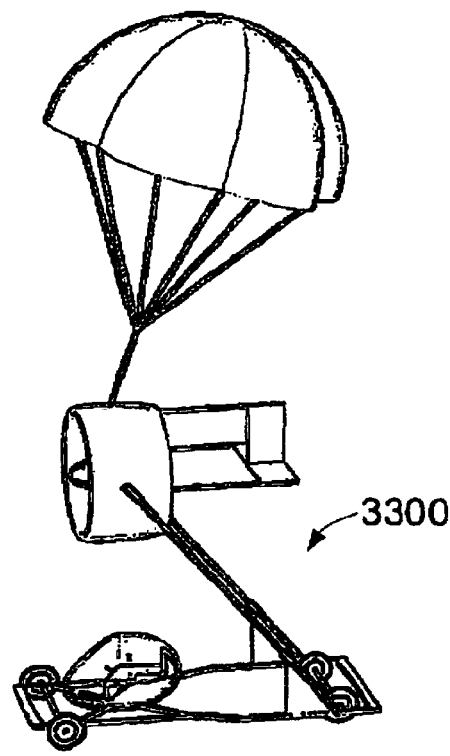
FIG. 39 is a perspective view of the embodiment of FIG. 33 with a vehicle parachute deployed.
Figure 40:
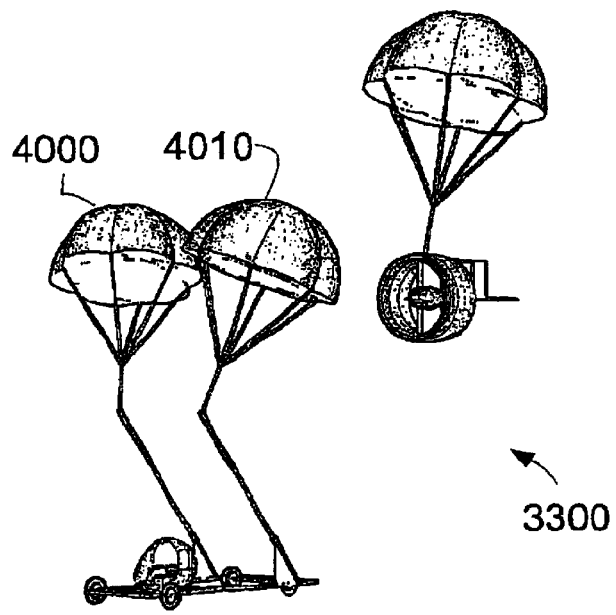
FIG. 40 is a perspective view of the embodiment of FIG. 33 with suspension structure parachutes deployed.
Figure 43:
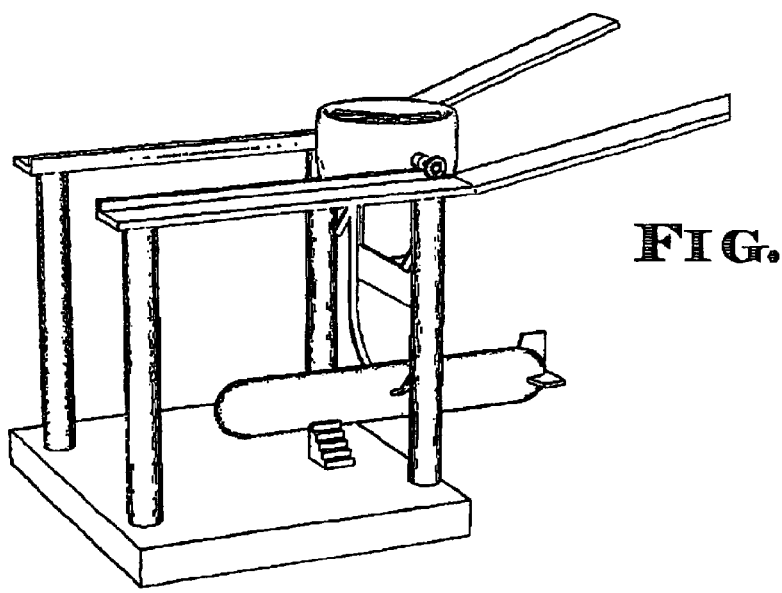
FIG. 43 is a perspective overview of the embodiment of FIG. 41 on an elevated platform according to various aspects of the invention during an exemplary boarding operation.
Figure 44:
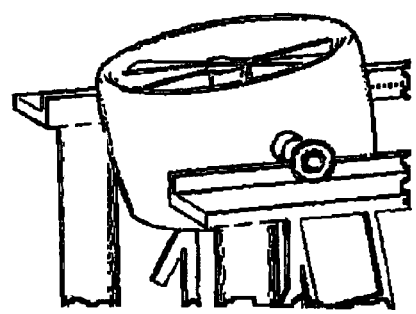
FIG. 44 is a perspective detail of the embodiment of FIG. 41 with landing gear on the elevated platform of FIG. 43.
Figure 45:
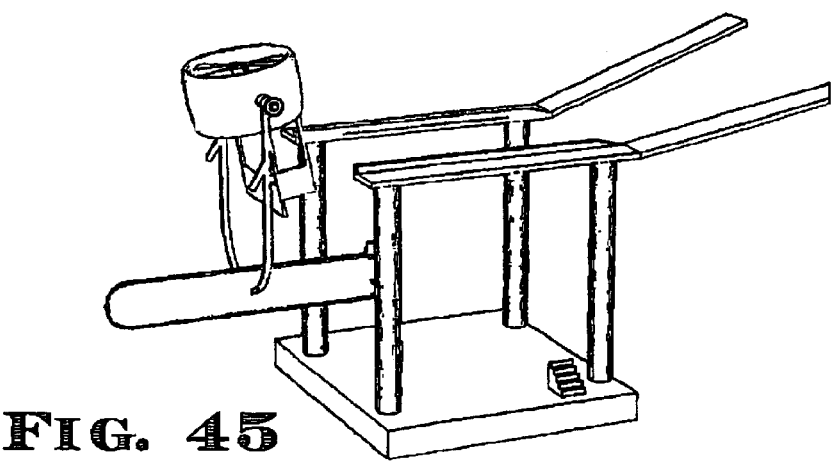
FIG. 45 is a perspective overview of the embodiment of FIG. 41 during launch from an elevated platform.
Figure 46:
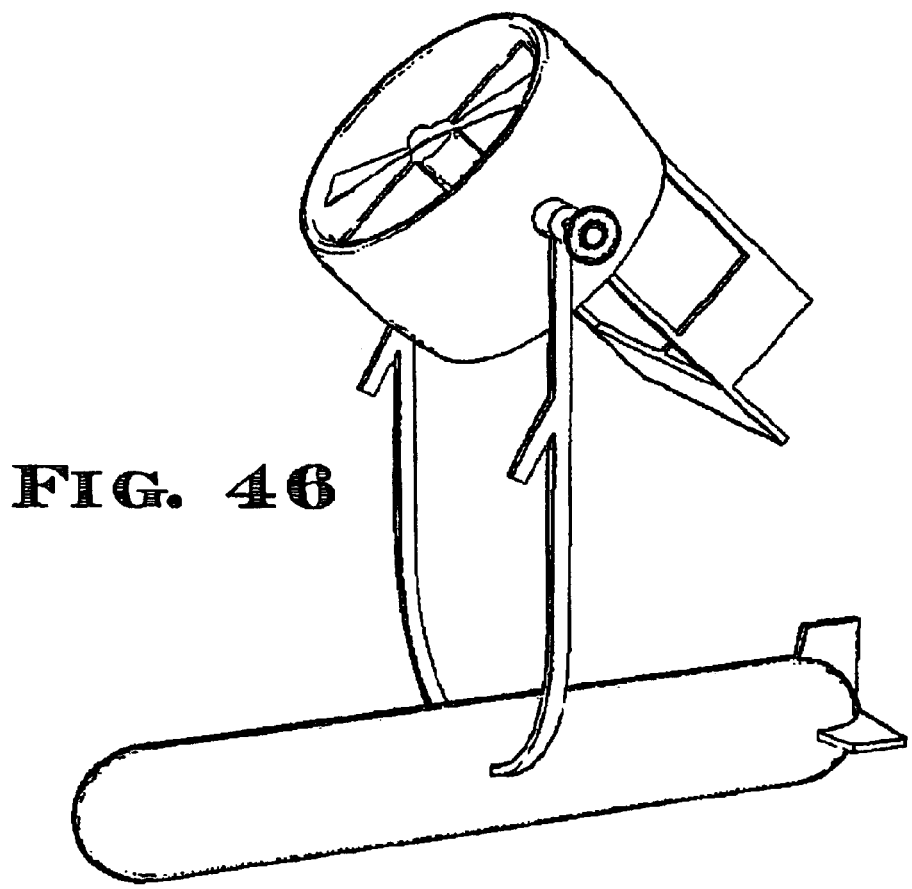
FIG. 46 is a perspective view of the embodiment of FIG. 41 with a vehicle in transition.
Figure 47:
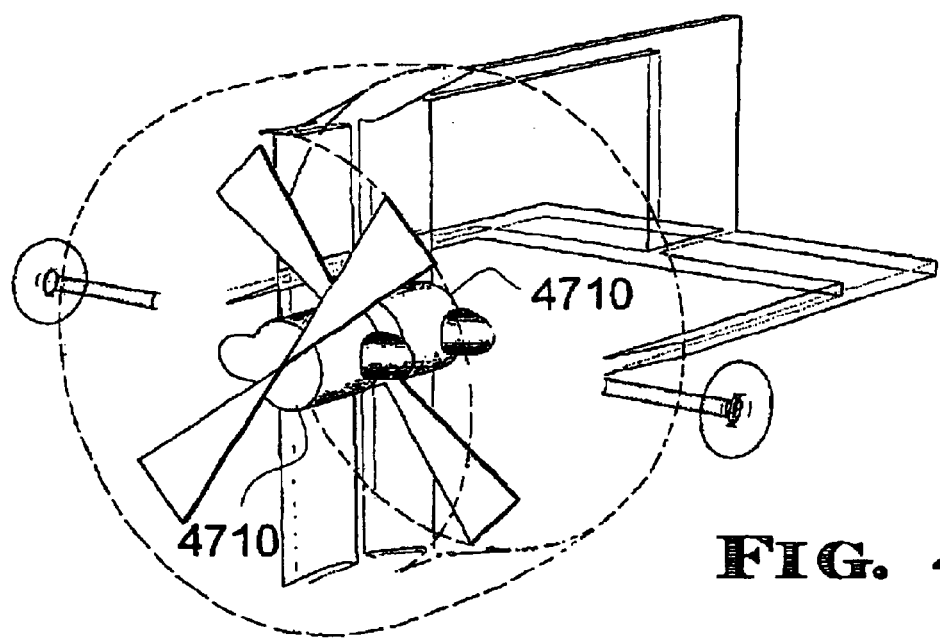
FIG. 47 is a perspective view of a propulsion system of the embodiment of FIG. 41.

Embodiment 3300 provides a method for transporting a payload unit that includes operating the engines with propellers for acceleration, turning the front wheels 3390 for directional control, and braking the wheels for deceleration and to supplement directional control. A ground transition method includes pitching the annular-wing vehicle into a vertical orientation (FIG. 35) and accelerating the engines to lift the annular-wing vehicle, while extending the telescoping support shafts of suspension structure 3370 and extending the tail truss structure 3365 away from annular wing 3380 (FIG. 36). In flight, annular wing 3380 moves toward horizontal, as illustrated in FIG. 37–38. The ground transition method is reversed to land the aircraft. In the event of an emergency, a recovery method includes deploying a parachute 3900 from the top of the annular-wing vehicle (FIG. 39) and separating the annular-wing vehicle from the support structure while deploying parachutes 4000, 4010 attached to the support structure (FIG. 40).

Another embodiment 4100 particularly suited for civil air transport or munitions deployment may be better understood with reference to FIGS. 41–47. The scale of embodiment 4100, as with all of the numerous possible embodiments of the invention, accommodates passengers or cargo depending on the needs of its particular use. For example, payload unit 4110 of embodiment 4100 can be tens or even hundreds of meters in length to accommodate payload of a pilot and passengers. Payload unit 4110 includes fins 4120 to assist with directional control and alignment of the centerline of payload unit 4110 with the ground.

Figure 48:
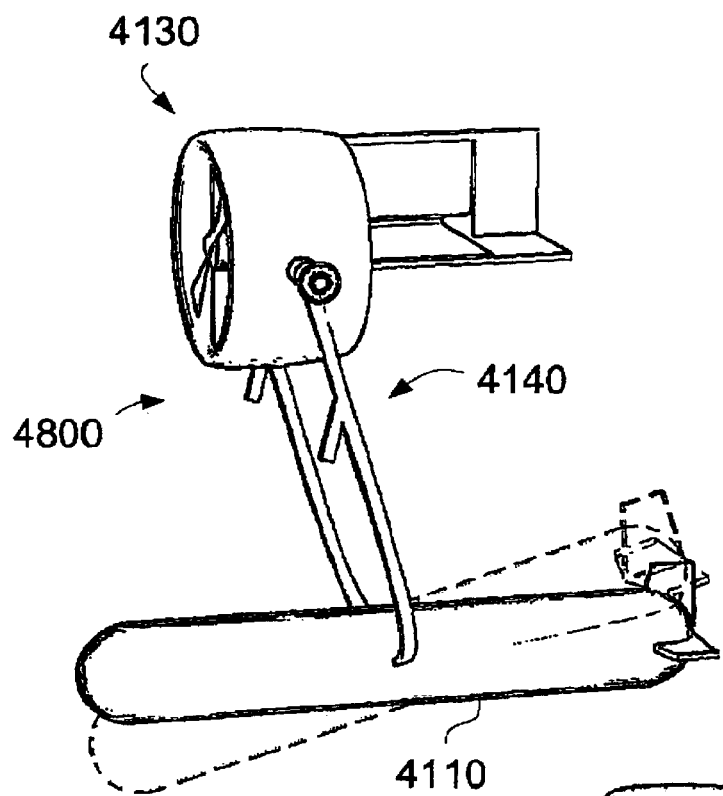
FIG. 48 is a perspective view of the embodiment of FIG. 41 with an alternative rotatable coupling.
Figure 49:
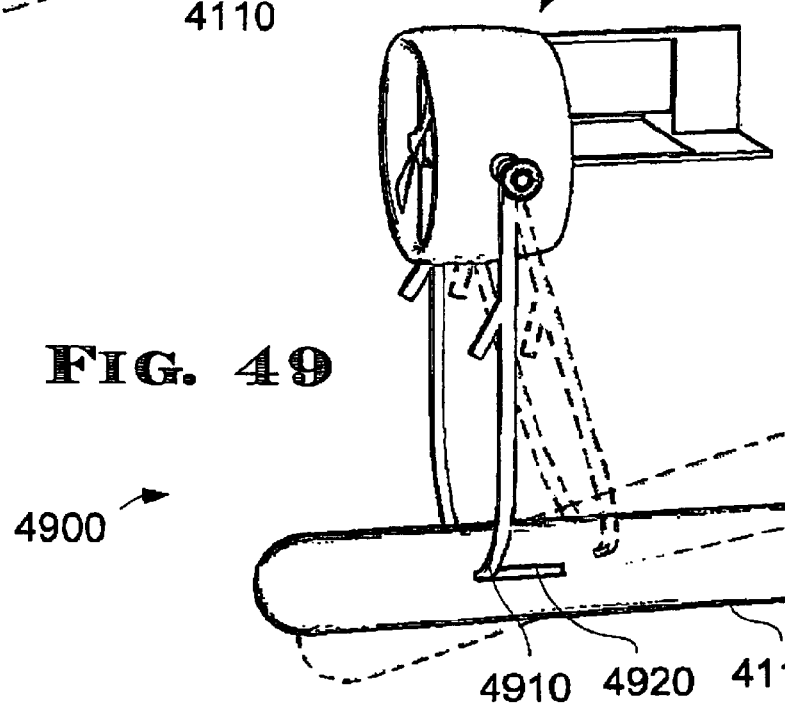
FIG. 49 is a perspective view of the embodiment of FIG. 41 with an alternative slidable coupling.
Figure 50:
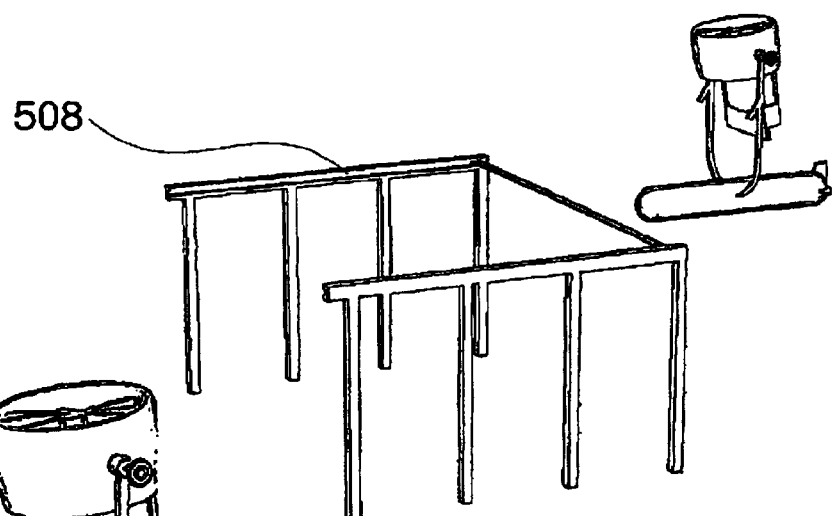
FIG. 50 to 52 is a perspective view of the embodiment of FIG. 41 with a emergency recovery operation.
Figure 51:
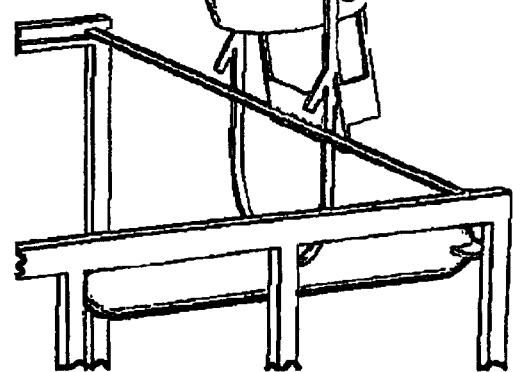
Figure 52:
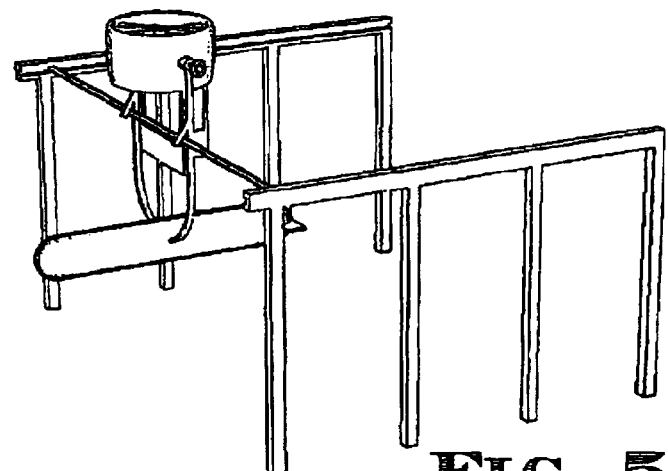
Figure 53:
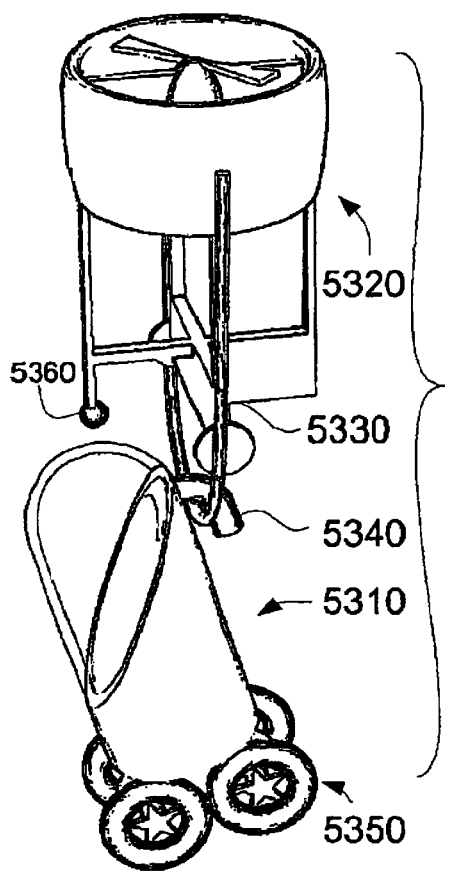
FIG. 53 is a perspective overview of another embodiment of the invention in vertical orientation.
Figure 54:
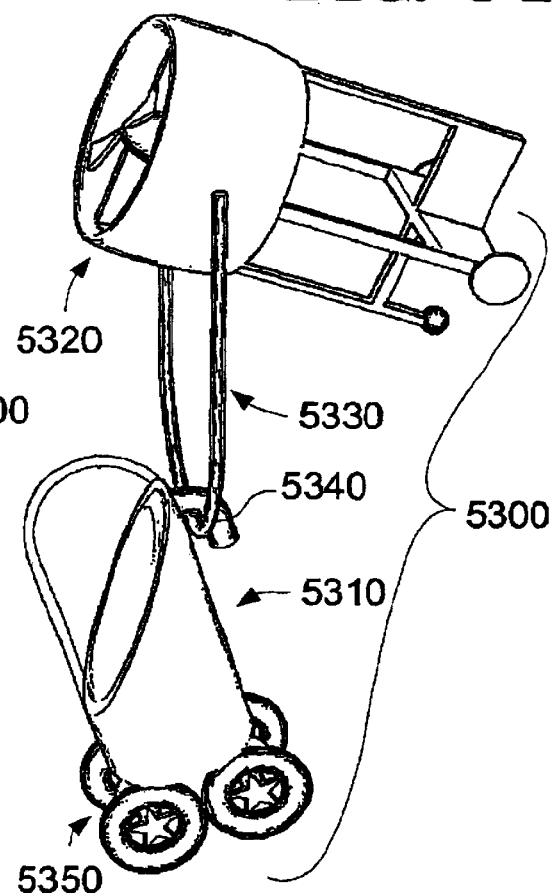
FIG. 54 is a perspective overview of the embodiment of FIG. 53 in transition.
Figure 55:
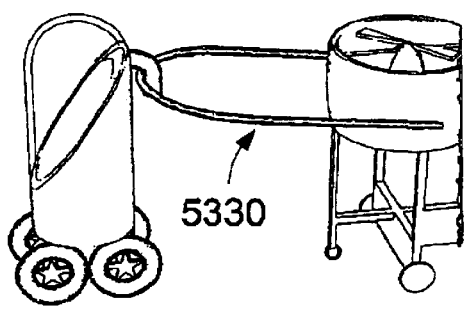
FIG. 55 is a perspective overview of the embodiment of FIG. 53 in hitched ground operation.
Figure 56:
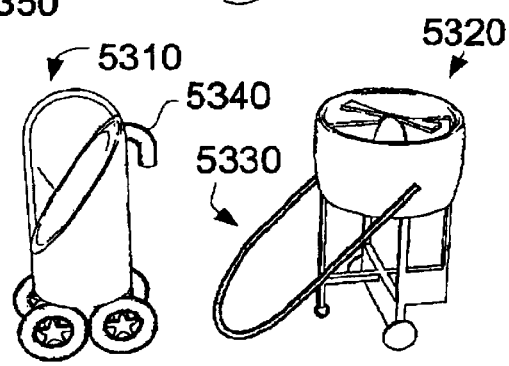
FIG. 56 is a perspective view of the embodiment of FIG. 53 in an unhitched ground operation.
Figure 57:
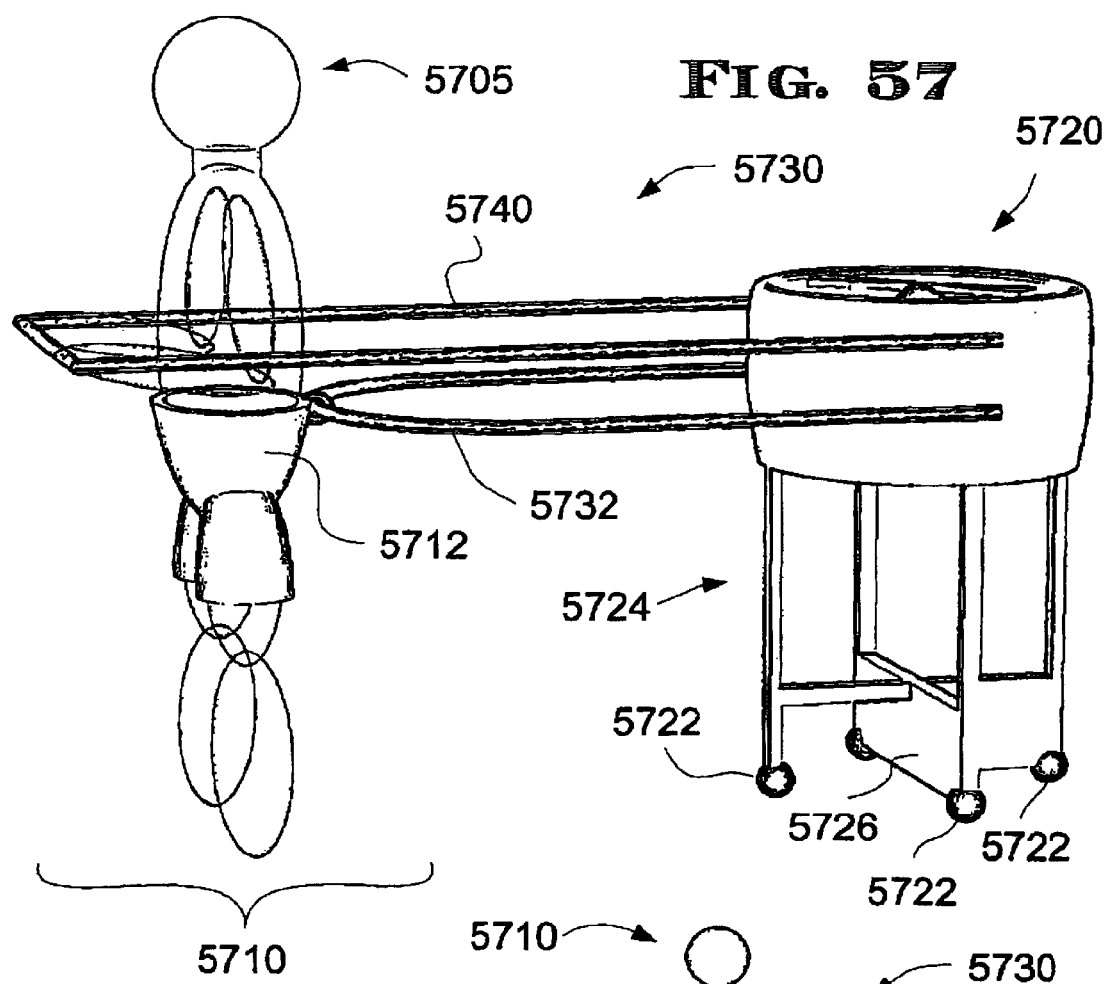
FIG. 57 is a perspective overview of another embodiment of the invention on the ground with a schematically depicted pilot.
Figure 58:
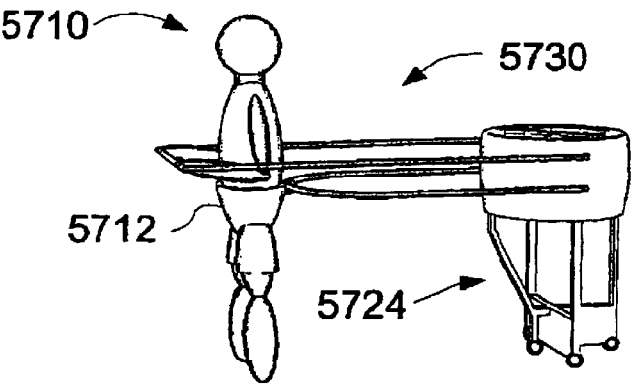
FIG. 58 is a perspective overview of the embodiment of FIG. 57 on the ground.
Figure 64:
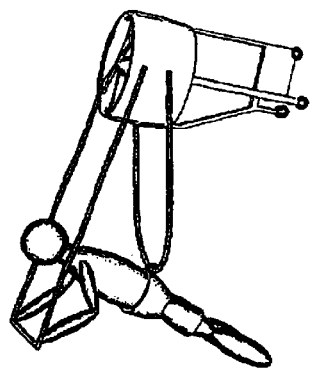
FIG. 59 to 64 is a perspective view of the embodiment of FIG. 57 with a launch and transition towards horizontal flight.
Figure 63:
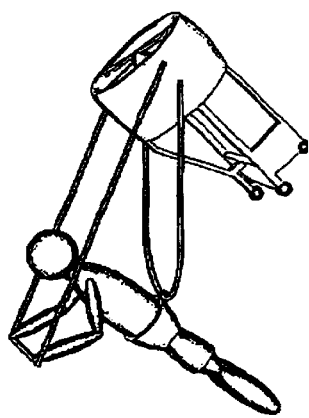
Figure 62:
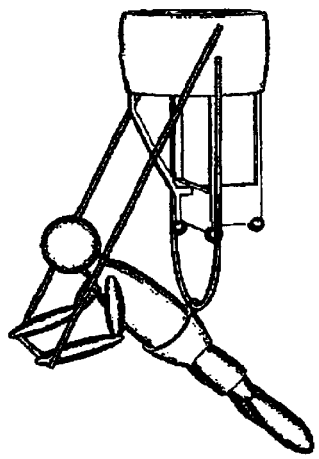
Figure 61:
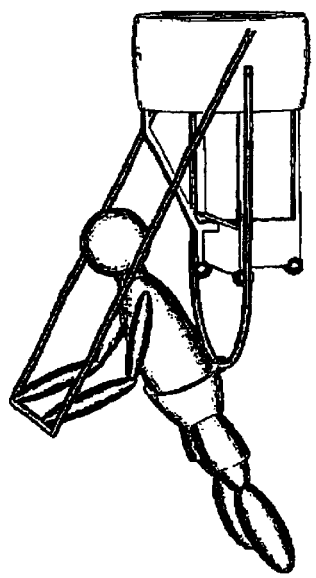
Figure 60:
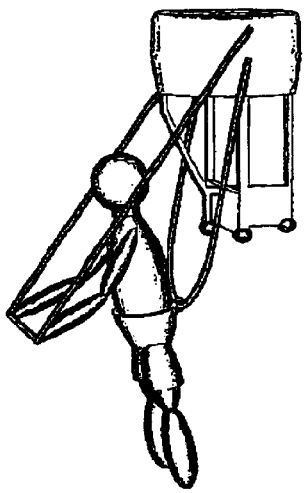
Figure 59:
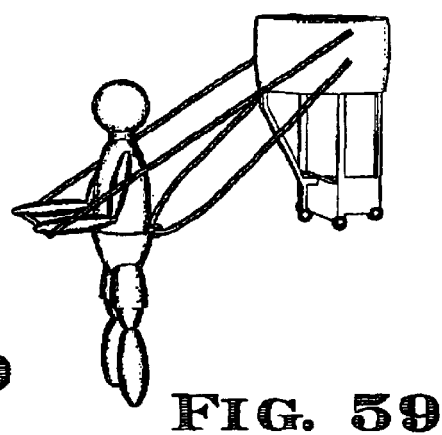

Except as discussed below, embodiment 4100 can employ corresponding structure of embodiment 300. The pair of slidable protuberances 314 of embodiment 300 are replaced by landing gear with wheels 502. Embodiment 4100 can take off and land from an elevated platform 504 (FIG. 42), as illustrated by the launching sequences of FIG. 42–44. Thrust-producing system 4130 of embodiment 4100 has two propulsion subsystems (turboshaft engines 4710, 4720 of FIG. 47, with propellers) and the annular wing includes fuel tanks. Suspension structure 4140 includes a pair of emergency arresting barbs 4142 (FIG. 41) for recovering the aircraft upon a ground-based arresting platform (FIGS. 50–52). In a variation 4800 of embodiment 4100 (FIG. 48), the coupling between the bottom end of suspension structure 4140 and payload unit 4110 includes a rotatable coupling structure for aligning the centerline of payload unit 4110 with the ground, providing increased passenger comfort. In yet another variation 4900 of embodiment 4100 (FIG. 49), the coupling between the bottom end 4910 of suspension structure 4140 and the payload unit includes a slidable coupling 4920, such as a groove, for aligning the bottom end 4940 with the center of mass of payload unit 4110, providing further increased passenger comfort.

Embodiment 4100 can carry out a method for transporting a payload unit, which differs from the method performed by embodiment 300 in the following ways. As may be better understood with reference to FIG. 47, a gyrodynamically neutral process for converting fuel to thrust is, in this exemplary method, provided for by a pair of turboprop engines 4710 and 4720. Engine 4710 is positioned in front of and rotates counter to engine 4720. An aerodynamic process assists with aligning the centerline of the payload unit with the ground. An exemplary process (FIGS. 43–45) for launching embodiment 4100 includes guiding the annular-wing vehicle along the rails of an elevated platform 504. A landing process (FIG. 42) includes lowering lift unit 4130 of embodiment 4100 onto rails 4210 and 4220 of elevated platform 504. An emergency recovery process (FIG. 50 to 52) includes hooking emergency arresting barbs 506 onto ground based arresting platform 508. An alternative process (FIG. 48) for aligning the centerline of the payload unit with the ground includes rotating the payload unit with respect to the suspension structure. Yet another alternative process (FIG. 49) for aligning the centerline of the payload unit with the ground includes moving the couple between the bottom end of the suspension structure and the payload unit towards the center of mass of the payload unit.

Another embodiment 5300 particularly suited for personal transportation may be better understood with reference to FIGS. 53–56. Except as discussed below, embodiment 5300 can employ corresponding structure of embodiment 200. Embodiment 5300 is suitably scaled to accommodate a passenger as payload of its payload unit 5310. Lift unit 5320 of embodiment 5300 includes landing gear 5360 attached to the aft end of its tail truss structure. Embodiment 5300 includes a loop-type suspension structure 5330 that can engage a hitch coupling 5340, which is attached to payload unit 5310 for easy separation of lift unit 5320 and payload unit 5310. Coupling 5340 thus facilitates convenient replacement of payload unit 5310 with a different payload unit Payload unit 5310 advantageously includes a wheeled base 5350, with which a passenger in payload unit 5310 can travel over the ground away from a parked lift unit 5320.

An exemplary method for transporting a payload unit with embodiment 5300 may be better understood with reference to FIGS. 53–56. For flight, a passenger enters payload unit 5310 and doses its canopy. For landing without a payload, lift unit 5320 lowers onto the tail truss structure in a vertical orientation. For ground transportation, wheeled base 5350 within payload unit 5310 tows lift unit 5320. For autonomous ground transportation, payload unit 5310 unhitches from suspension structure 5330 and moves away from lift unit 5320. When the autonomous ground transportation is complete, payload unit 5310 moves towards lift unit 5320 and re-hitches to suspension structure 5330.

Another embodiment 5700 particularly suited for hang flying of an individual pilot 5705 may be better understood with reference to FIGS. 57–65. Except as discussed below, embodiment 5700 can employ corresponding structure of embodiment 200. Embodiment 5700 is suitably scaled to accommodate pilot 5705, who constitutes payload that forms the bulk of a payload unit 5710 of embodiment 5700 in the configuration depicted. Payload support structure of payload unit 5710 primarily consists of a harness 5712. When no pilot is present to serve as payload, payload unit 5710 consequently has too little remaining weight for effective flight even if such unpiloted flight were possible.

Lift unit 5720 of embodiment 5700 includes castors 5722 attached to the aft end of a tail truss structure 5724 of lift unit 5720. A harness 5732 straps pilot 5705 to payload unit 5710 via suspension structure 5730, to which harness 5712 is rotatably attached. A control bar 5740 extends from lift unit 5720, with which pilot 5705 can control roll, pitch, yaw, and throttle. Slab pitch control surface 280 of embodiment 200 is replaced in embodiment 5700 by a fixed horizontal stabilizer 5726. The slab yaw control surface is replaced by a fixed vertical stabilizer. Furthermore, the annular-wing vehicle includes a parachute 6510 (FIG. 65).

Figure 65:
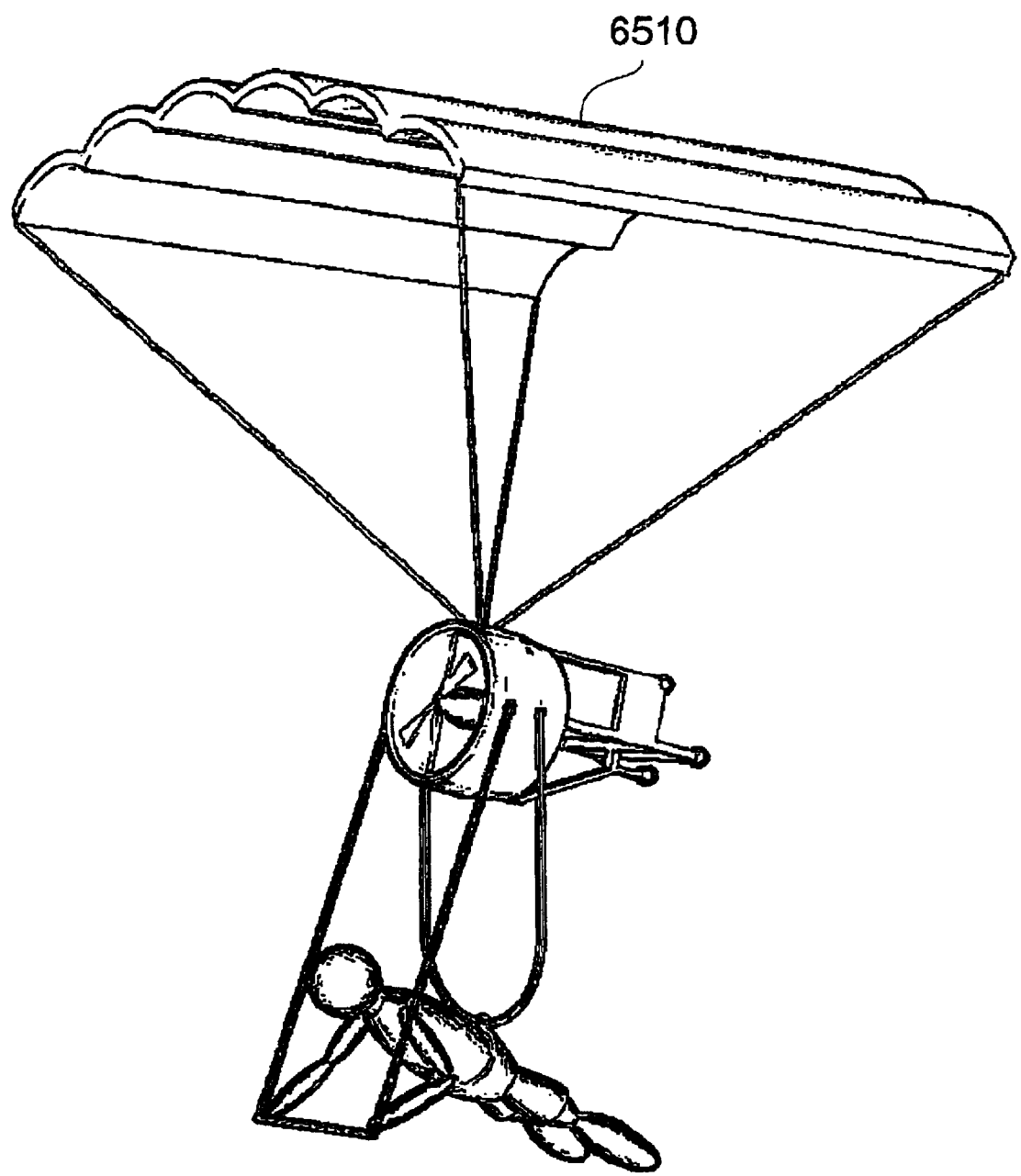
FIG. 65 is a perspective view of the embodiment of FIG. 57 with a landing parachute deployed.

An exemplary method for transporting a payload unit with embodiment 5700 may be better understood with reference to FIGS. 57–65. Pilot 5705 straps on harness 5732. For controlling the direction of flight, pilot 5705 applies weight and bodily force to control bar 5740. For accomplishing a low-speed landing embodiment 5700 deploys a parachute 6510 (FIG. 65).

Another embodiment 6600 particularly suited for extended-range fixed-wing flight may be better understood with reference to FIGS. 66–67. Except as discussed below, embodiment 6600 can employ corresponding structure of embodiment 100. Embodiment 6600 includes a lift unit 6720, which includes an electric motor (not shown), which offers reliable operation. Payload container 6714, which suspends below lift unit 6720 as part of payload unit 6710, houses batteries (also not shown) that power the motor. This configuration permits the heavy batteries to serve as payload, yielding improved roll stability in cruise. Power lines (not shown) extending from the payload unit up to the motor inside (or alongside) one or both legs of suspension structure 6730.

Payload container 6714 also houses circuitry of an RF avionics control system (not shown), which receives a control signal (of any suitable type) from a remote control operator. The avionics control system communicates with one or more flight control surfaces of lift unit 6720 via actuator control wires (not shown) positioned inside (or alongside) one or both support shafts of suspension structure 6730. The avionics control system further includes an antenna (not shown), of suitable length for the RF frequency being employed, positioned on one side of suspension structure 6730. Suspension structure 6730 is preferably fabricated from nonconductive material (e.g., PVC, fiberglass, etc.) so that the antenna remains clear of any near-field electromagnetic effects. In a variation, one or both of the support shafts of suspension structure 6730 includes conductive material along all or part of its circumference and is suitably dimensioned and electrically coupled to the avionics control system to serve as an antenna.

Payload unit 6710 includes a free wing 6712, which attaches to suspension structure 6730 to provide lift and support the weight of payload container 6714. Free wing 6712 provides efficient lift that helps extend the aircraft's range. Free wing 6712 also absorbs atmospheric turbulence, providing smooth transportation of the payload in container 6714.

Figure 68:
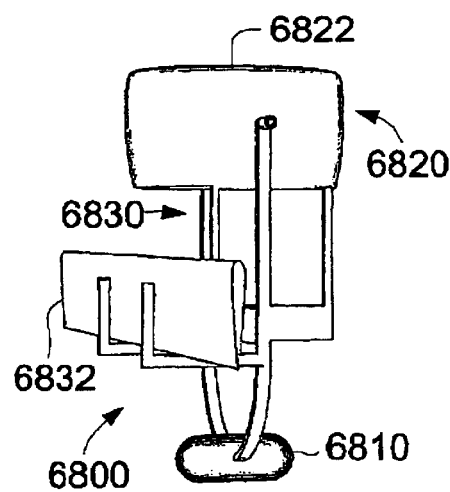
FIG. 68 is a perspective view of another embodiment of the invention in hover.
Figure 69:
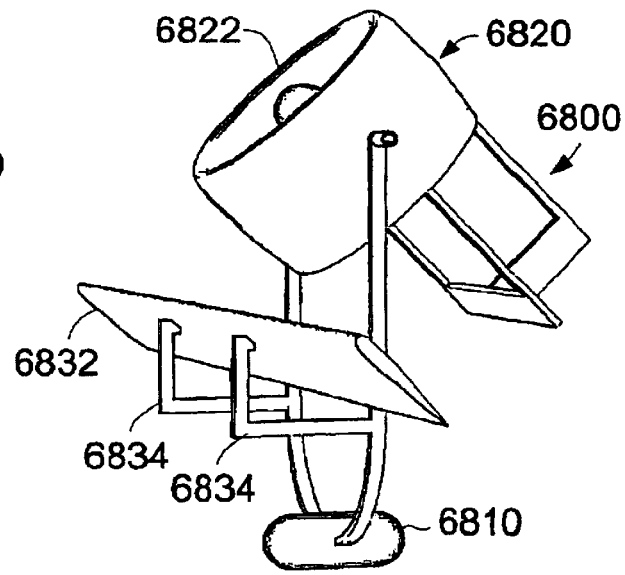
FIG. 69 is a perspective view of the embodiment of FIG. 68 in transition.
Figure 70:
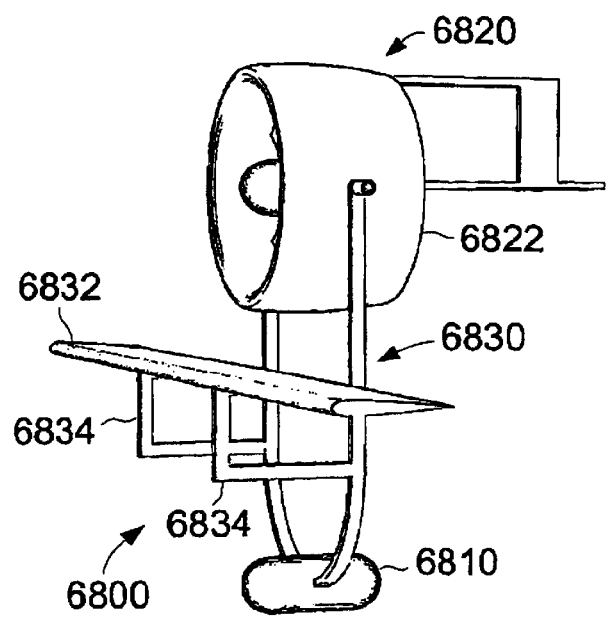
FIG. 70 is a perspective view of the embodiment of FIG. 69 in horizontal flight.

Another embodiment 6800 particularly suited for support of a payload unit 6810 in unmanned extended-range fixed-wing flight may be better understood with reference to FIGS. 68–70. Except as discussed below, embodiment 6800 can employ corresponding structure of embodiment 300. Suspension structure 6830 of embodiment 6800 includes a free wing 6832 attached to it in front of an annular wing 6822 of lift unit 6820, which provides improved cruise performance. Suspension structure 6830 further includes supports 6834 extending towards the front of the aircraft, preferably fabricated from ½ inch wide aluminum window screen frame stock. Free wing 6832 can include a balsa wood frame covered by a plastic heat-shrink film and a pivotal coupling to attach free wing 6832 to supports 6834.

Figure 71:
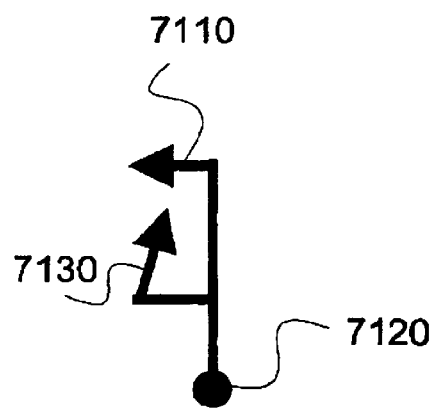
FIG. 71 is a vector diagram of forces developed in the embodiment of FIG. 70 during horizontal flight.

A vector diagram depicting the force that free wing 6832 and annular wing 6822 exert on payload unit 6810 is shown in FIG. 71. This diagram illustrates that, at cruise point performance, annular wing 6822 produces lift equivalent to its own weight. Thus the only force of significance exerted on payload unit 6810 by lift unit 6820 in horizontal flight is horizontal thrust. The weight of the payload is sustained by aerodynamic lift that free wing 6832 develops. As illustrated in the vector force diagram of FIG. 71, the thrust (vector 7110) exerts a nose-down moment on payload unit 6810 that is balanced by a nose-up moment that free wing 6832 produces (vector 7130). The vertical component of force produced by free wing 6832 (vector 7130) counterbalances downward force (vector base 7120) from the weight of embodiment 6800.

Figure 72:
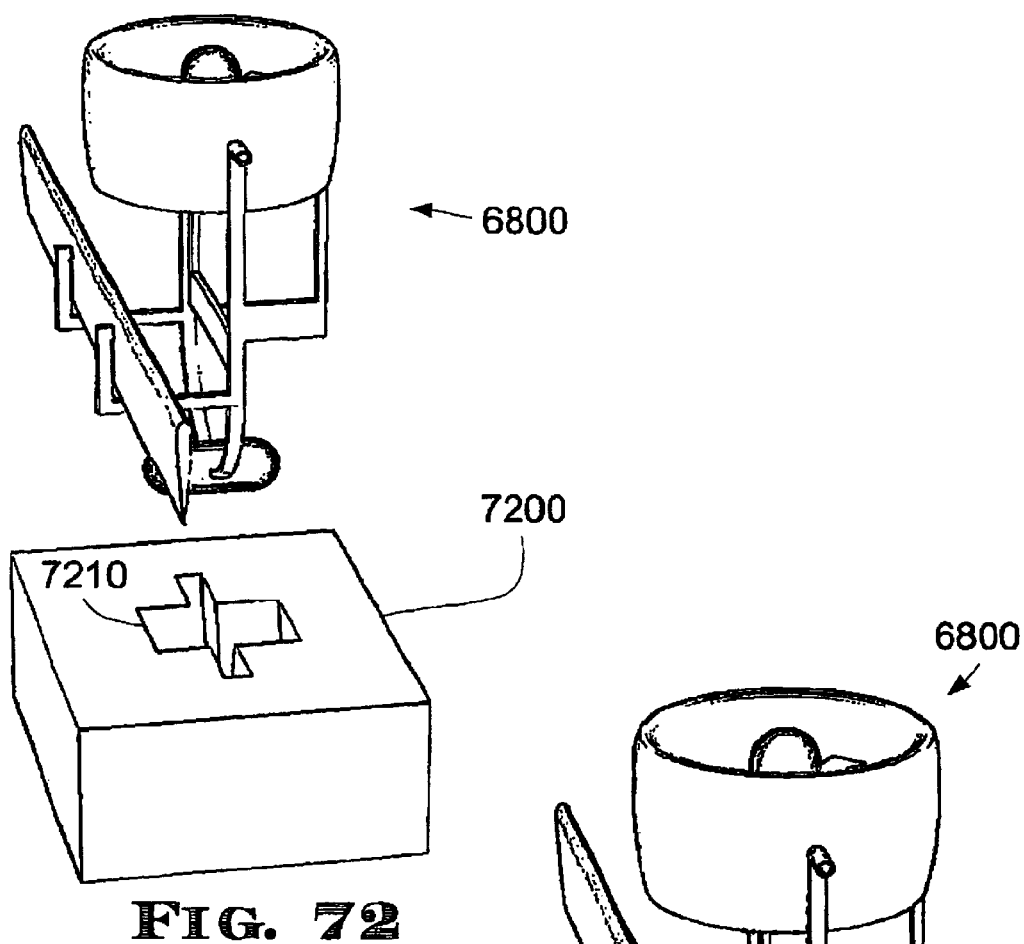
FIG. 72 is a perspective view of the embodiment of FIG. 71 landing in a base unit according to various aspects of the invention.
Figure 73:
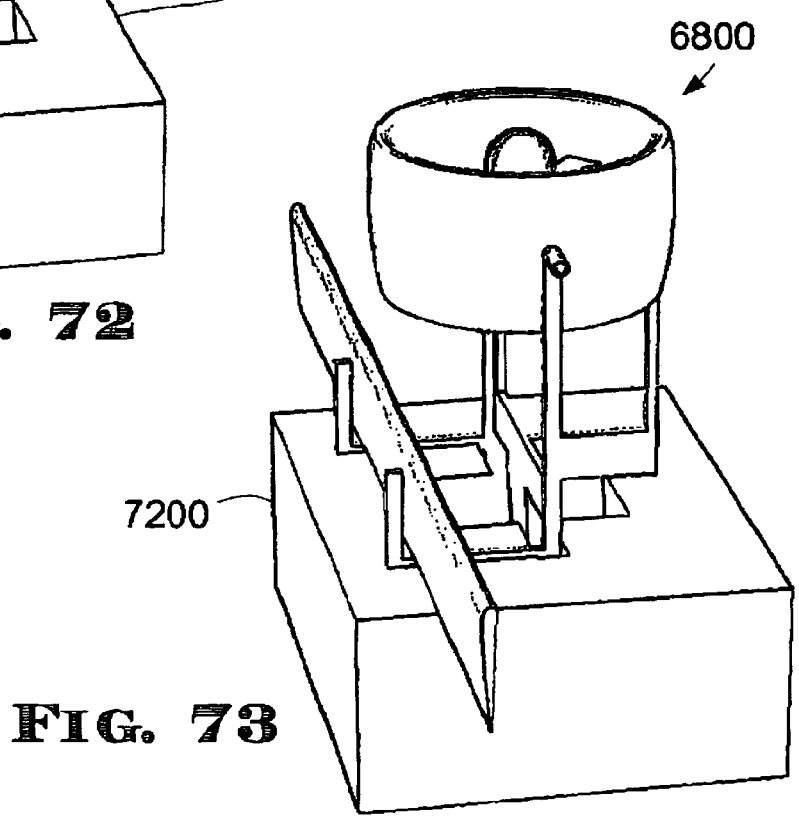
FIG. 73 is a perspective view of the embodiment of FIG. 72 upon landing in the base unit of FIG. 72.
Figure 74:
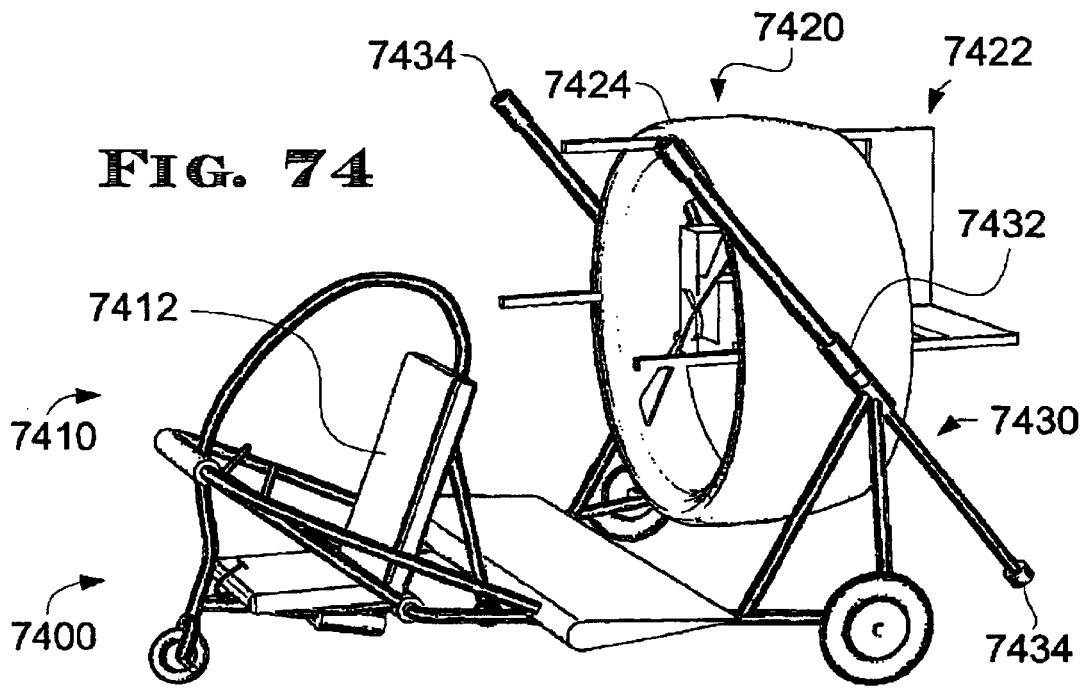
FIG. 74 is a perspective overview of another embodiment of the invention in a taxiing configuration.
Figure 75:
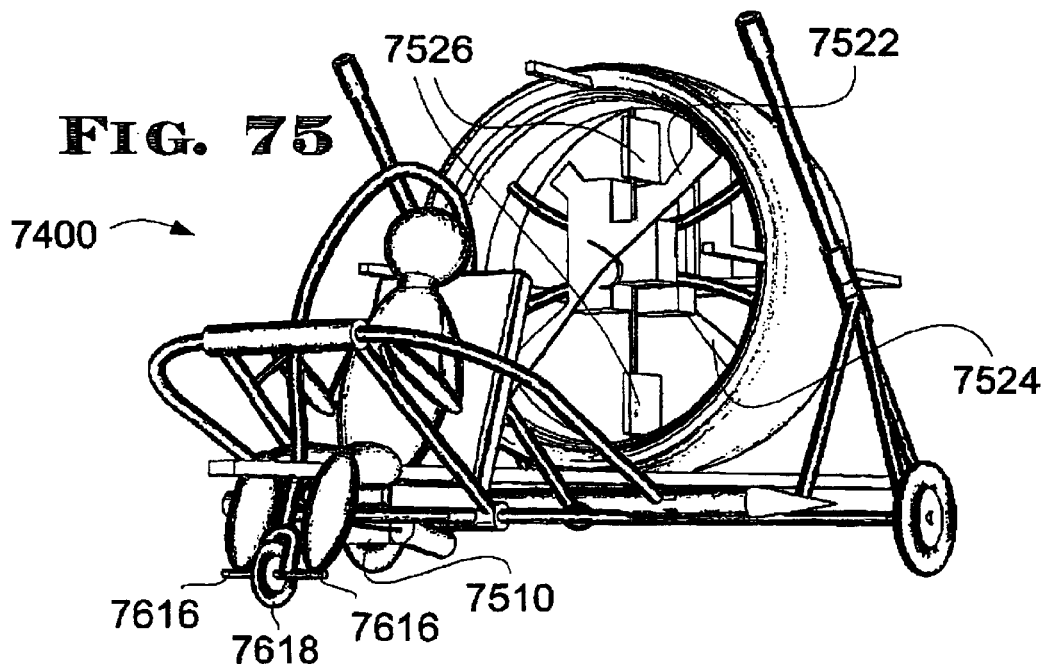
FIG. 75 is a perspective overview of the embodiment of FIG. 74 with a pilot
Figure 80:
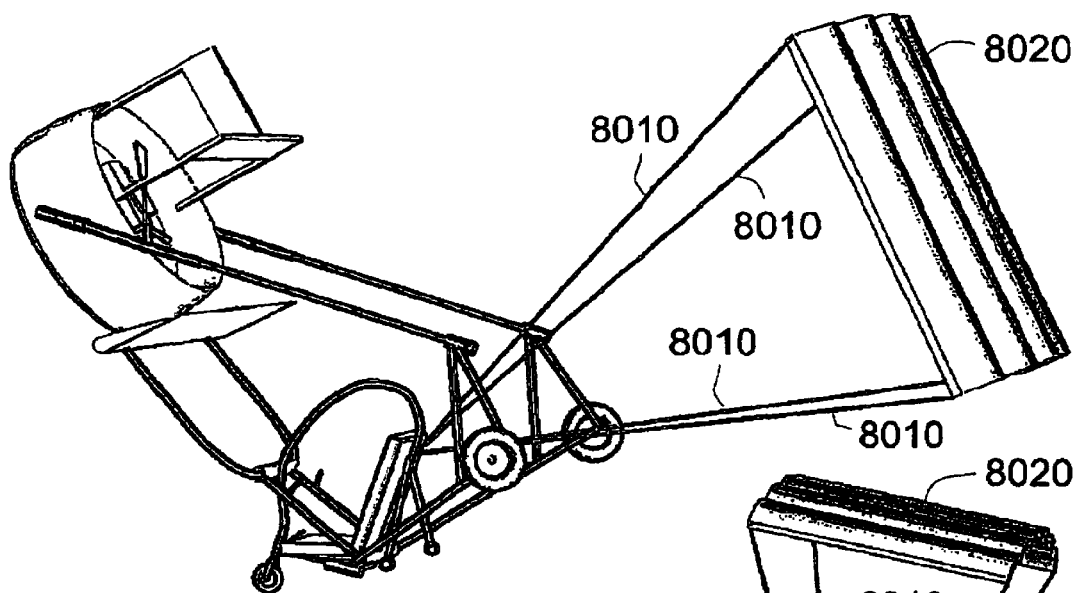
FIGS. 80 and 81 are perspective views of the embodiment of FIG. 74 during deployment of a ballistic recovery system according to various aspects of the invention.

As may be better understood with reference to FIGS. 72–73, embodiment 6800 can take off from and land in a base unit 7200, in which it can be stored and serviced between flights. Base unit 7200 advantageously includes electrical connections that couple a battery charger to batteries (none shown) inside payload unit 6810. Base unit 7200 includes a receiving aperture 7210 for retaining embodiment 6800. Electric power from base unit 7200 can power lift unit 6820 (while electrical connection is maintained) without draining the batteries in payload unit 6810, e.g., to spin up the motors in lift unit 6820.

Embodiment 6800 can be flown in a manner similar to flight of embodiment 6600, with a few notable differences. Base unit 7200 retains embodiment 6800 while electric power from base unit 7200 powers lift unit 6820 without battery drain. In this manner, embodiment 6800 can become airborne and begins transitioning towards cruise before any load is placed on the batteries, thereby extending their useful life and increasing their endurance.

Another embodiment 7400, which may be better understood with to FIGS. 74–81, includes a pair of bearings 7432 that couple together an annular-wing lift unit 7420 and a suspension structure 7430 with a payload unit 7410 that includes a seat 7412 and a pilot (not shown). Annular-wing vehicle lift unit 7420 includes: an annular wing 7424; a propulsion subsystem (FIG. 75) having a tractor propeller 7522 and a pusher propeller 7524; and a tail 7422 positioned in the slip stream of propellers 7522 and 7524, which provides pitch and yaw authority even at zero airspeed.

A tail truss 7722 (FIG. 77) supports tail 7422 and slides into annular wing 7424 upon landing. Variable pitch stators 7526, positioned within the duct of annular wing 7424 between propellers 7522, 7524, provide roll control. Suspension structure 7430 includes a wide-base wheel set in a tricycle configuration for ground stability and potential operation as a street-legal motorcycle, and a pair of telescoping shafts 7434 for relative movement of lift unit 7420 during takeoff and landing. A free wing 7910 mounted to suspension structure 7430 provides aerodynamic lift during horizontal flight (FIG. 79). A ballistic recovery system 7510 (FIG. 75) mounted under seat 7412 provides for fail-safe operation, as discussed below.

Seat 7412 is equipped with two side stick controllers 7612, 7614 (FIG. 76). A coordinate system is employed that is fixed for all control inputs relative to lift unit 7420. Left stick 7612 controls throttle and roll. Right stick 7614 controls pitch and yaw. Ground operation is controlled by the throttle and foot pegs 7616 (FIGS. 75–67) attached to a fork of a front wheel 7618. The throttle control connects to rear wheel brakes such that a throttle setting below engine idle applies the brakes. The pilot controls ground steering using left and right foot pressure, which turns front wheel 7618 to the left or right.

Embodiment 7400 articulates naturally between three basic configurations: taxi, hover, and cruise. In taxi (FIGS. 74–75), lift unit 7420 rests on the then-grounded suspension structure 7430. In preparation for take-off (FIG. 76), a horizontal control surface on tail 7422 deflects to create a pitch-up moment that rotates lift unit 7420 into a nose up attitude. As the engines accelerate (FIG. 77), the truss of tail 7422 extends and lift unit 7420 rises, lifting suspension structure 7430 out of ground effect. Tail 7422 again deflects, but this time only slightly to nudge the thrust vector developed by lift unit 7420 forward and begin forward movement. As embodiment 7400 accelerates forward (FIG. 78), a relative wind increasingly acts upon tail 7422 to pitch lift unit 7420 forward and lift free wing 7910 toward a cruise configuration. In cruise (FIG. 79), free wing 7910 lifts payload unit 7410 while lift unit 7420 lifts itself and provides excess horizontal thrust to propel payload unit 7410 forward. The three discrete configurations of embodiment 7400 (taxi, hover, and cruise) are actually part of a continuum that naturally matches the flying vehicle's configuration to the aerodynamic environment.

Embodiment 7400 is inherently stable and controllable in taxi, hover, and cruise. The taxi configuration (FIGS. 74–75) places the flying vehicle's center of mass forward of its aerodynamic center, which provides directional stability. Foot pegs 7616 on the fork of front wheel 7618 provide directional control. Ground roll stability is provided by the wide rear wheel base and the low center of mass, which is necessary to offset the high center of pressure of annular wing 7910. The flying vehicle is neutrally stable in hover (FIG. 77), with its center of thrust directly above its center of mass. When the flying vehicle is displaced from hover, either by a gust or due to a control input, the flying vehicle naturally moves towards forward flight (FIGS. 78–79) unless a correcting control input reestablishes hover.

Stalls of embodiment 7400 should be rare, perhaps even nonexistent. Both lift unit 7420 and free wing 7910 are freely pivoting lifting surfaces that always produce lift and avoid stalling during unpowered descent. In the event both engines powering 7522, 7524 fail, an emergency landing procedure can be employed. This procedure includes lowering the nose of lift unit 7520 to energize propellers 7522, 7524, then flaring into a soft landing with the autorotating propellers producing lift.

Embodiment 7400 has vertical takeoff capability and can be towed or pushed to a suitable launch location. Furthermore, it can be driven to the launch location, with just one engine operating to provide aerodynamic propulsion.

In the event of an unforeseen catastrophic failure, payload unit 7410 is equipped with a ballistic recovery system 7510 (FIG. 75) that can launch aftward from beneath seat 7412. As may be better understood with reference to FIGS. 80–81, recovery system 7510 includes a parachute 8020 with parachute lines 8010 connected near the top of seat 7412. This arrangement provide easy access for pilot controlled descent.

Public Notice Regarding the Scope of the Invention and Claims

The inventor considers various elements of the aspects and methods recited in the claims filed with the application as advantageous, perhaps even critical to certain implementations of the invention. However, the inventor regards no particular element as being "essential," except as set forth expressly in any particular claim.

In addition, many variations of the preferred embodiments disclosed above can be employed without going outside the scope of claims that do not specifically exclude them. For example, there are various possibilities for configuring an annular-wing flying vehicle for efficient vertical flight, efficient high-speed cruise, or a balanced design that performs well in both vertical flight and cruise. These possibilities involve known combinations of shaped propellers, shaped pre-rotators and stators, shaped nacelles surrounding the machinery attached to the engine mount, shaped interior surfaces of the annular wing, and sizing of the annular wing. Specifically, vertical flight performance is most efficient for high-solidity propellers having a large number of wide blades, large nacelles having a large-diameter boss, and a large exit area defined by the combination of nacelle and annular wing shape. High-speed horizontal cruise is most efficient for low-solidity propellers having a small number of narrow blades, small nacelles having a small-diameter boss, and a constant cross-sectional area from inlet to exit defined by the combination of nacelle and annular wing. Furthermore, these propellers, nacelle, and wings can have a variable geometry to allow shape reconfiguration to optimize efficiency for multiple flight conditions. Finally, by reducing the total wing area and cruising at higher angles of attack supported by energized airflow through the annular wing, parasitic drag can be reduced and high-speed cruise efficiency can increase.

For embodiment 100, the payload unit can include a combination of weights and aerodynamic stabilizing and lifting surfaces to change the inertial and aerodynamic characteristics of the aircraft.

For embodiment 200, the piezo-gyro yaw rate stabilizer can be eliminated and the aircraft can still be flown. Furthermore, the rudders on the suspension structure are optional. The variable stators attached to aft of the engine mount can be replaced with variable stators forward of the engine mount.

For embodiment 300, the suspension structure can include an integral antenna attached to the payload unit and extending to the first end of the suspension structure, to improve the payload unit's radio transmission and reception. The payload unit can include a flight-control radio receiver and control logic, further including circuitry to interface with the flight-control actuators. The propulsion subsystem can include easily interchangeable engines, propellers, and nacelles, to allow the operator to reconfigure the annular-wing vehicle for efficient cruise, efficient loiter, a stealth mode of operation, or some other combination of mission requirements. The operational method can include hand launch and recovery process, whereby an operator places the aircraft into operation and recovers the aircraft solely by using human hands.

For embodiment 3300, the propellers can be of variable pitch with a thrust-reversing mode to assist with deceleration during ground operation. An automated aircraft control system can be integrated with an air traffic control system to provide air safety. The pneumatic system of the damped elastic mechanism can be replaced with a mechanical spring and damper system. The telescoping suspension structure can be passively extended and retracted as the annular-wing vehicle lifts and lowers itself, or it can be actively extended and retracted by an actuator or some other means for creating a mechanical force. The slidable truss structure can be passively extended and retracted as the annular-wing vehicle lifts and lowers itself, or it can be actively extended and retracted by an actuator or some other means for creating a mechanical force. A retractable ground stabilizing bar can extend laterally from second end of the suspension structure outward beyond the wheels and close to the ground, much like payload unit 208 of embodiment 200, to assist with yaw stability during launch and recovery operations.

For all embodiments having a lifting unit using an annular wing, the following variations can be implemented. The annular wing can include fuel tanks to increase the range and endurance of the aircraft. Operation can include a rolling take-off method including a forward ground roll to increase propeller efficiency for increased thrust prior to take-off.

Any payload unit can include a combination of weights and aerodynamic stabilizing and lifting surfaces to change the inertial and aerodynamic characteristics of the aircraft. In some variations, no payload itself need be included as part of a payload unit for effective flight. In such variations, or during ground transport, stowage, marketing displays, etc., the payload unit can consist merely of payload support structure.

Any payload unit can be aerodynamically shaped and textured to reduce vertical drag in vertical flight, and it can be thermally treated to resist a thermal rise due to hot gasses from the propulsion subsystem. The payload unit can be aerodynamically shaped to increase stability in vertical flight through Bernoulli interactions between the thrusting airstream and the payload unit, similar to the interaction between a ping pong ball and the column of air from a hair dryer.

Some of the many additional and diverse variations and purposes to which the invention can be applied include: fire fighting and medical evacuation processes; incorporating creature comforts into the payload unit; and producing thrust by means of any of the wide variety of known piston, rotary, turboprop, turbojet, and turbofan engine technologies. As an example, a turbofan engine could be specifically designed to meet the thrust, gyroscopic, and aerodynamic lift requirements of an annular-wing lift unit. While the scale of the preferred embodiments extends from a small model to a civil transport, larger or smaller embodiments can be implemented, from micro-scale aircraft to jumbo transport or passenger jets. While the preferred embodiments show a single column of thrust, configurations with multiple columns of thrust can be made. While the preferred embodiments include electrically powered flight control actuators, hydraulic, pneumatic, mechanically linked, and all other known actuating systems can be used. The examples provided are merely illustrative, not an exhaustive list of the wide variety of combinations of features and functions contemplated by the inventor.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. For example, claims that do not recite particular types of lift units read on annular-wing type lift units, fixed wing lift units, etc.

In addition, aspects of the invention are particularly pointed out in the claims using terminology that the inventor regards as having its broadest reasonable interpretation; the more specific interpretations of 35 U.S.C. § 112(6) are only intended in those instances where the terms "means" or "steps" are actually recited. The words "comprising," "including," and "having" are intended as open-ended terminology, with the same meaning as if the phrase "at least" were appended after each instance thereof.

What is claimed is:

1. A flying craft comprising:
    (a) a suspension structure having a first end and a second end;
    (b) a lift unit coupled to the first end of the suspension structure including:
        (1) at least one pair of torque producing propulsion systems including counter-rotating propellers,
        (2) wherein the lift unit is freely rotatable, within a predetermined angular range about only one rotational axis perpendicular to an axis passing through the first and second ends of the suspension structure, and
        (3) the lift unit is substantially restricted in movement relative to the first end of the suspension structure in a direction parallel to the rotational axis; and
    (c) a payload unit coupled to the second end of the suspension structure and positioned, by the suspension structure, to impart pendular stability to the lift unit;
    (d) wherein the suspension structure further includes a damned elastic mechanism to moderate movement of the suspension structure parallel to the rotational axis, thereby improving yaw control of the aircraft in vertical flight.

2. The craft of claim 1 wherein the lift unit is freely rotatable within a predetermined angular range of at least ninety degrees.

3. A flying craft comprising:
    (a) a suspension structure having two opposite ends;
    (b) a payload unit coupled to one end of the suspension structure; and
    (c) a lift unit coupled to the other end of the suspension structure and
        (1) freely rotatable, within at least a predetermined angular range, about only one rotational axis perpendicular to an axis passing through the opposite ends of the suspension structure, and (2) substantially restricted in movement, relative to the end of the suspension structure to which it is coupled, in a direction parallel to the rotational axis;

(d) wherein the lift unit comprises:
  (1) a motor oriented in a direction determined by the orientation of the lift unit and having sufficient power to lift the craft when oriented vertically, and
  (2) a wing structured to develop lift sufficient to support the craft during horizontal flight.

4. The craft of claim 3 wherein the payload unit lacks structure to support its own weight in flight and has at least a significant part of its weight suspended from the lift unit.

5. The craft of claim 4 wherein the payload unit lacks any wings, wherein the payload unit does not provide any substantial aerodynamic lift during horizontal flight and thereby has all rather than part of its weight suspended from the lift unit.

6. The craft of claim 3 wherein the lift unit is freely rotatable within an angular range of at least 90 degrees.

7. The craft of claim 3 wherein the motor comprises a pair of counter-rotating propellers, one of the propellers being positioned in front of and rotating counter to the other propeller, whereby the aircraft has improved pitch and yaw control in vertical flight.

8. The craft of claim 3 wherein the motor includes a jet engine.

9. The craft of claim 3 wherein the wing is an annular wing.

10. The craft of claim 3 wherein the wing is deployable in flight.

11. The craft of claim 3 wherein the payload unit comprises payload support structure.

12. The craft of claim 3 wherein the payload unit comprises a payload.

13. The craft of claim 3 wherein the payload unit is coupled to the suspension structure above the center of mass of the payload unit, thereby permitting it to maintain a constant orientation regardless of the orientation of the suspension structure.

14. The craft of claim 13 in a horizontal flight configuration in which wind resistance applies horizontal force to the payload unit, wherein the payload unit is suspended below the lift unit and displaced aft therefrom.

15. The flying craft of claim 3 wherein the payload unit is positioned, by the suspension structure, to impart pendular stability to the lift unit.

16. The flying craft of claim 3 wherein the suspension structure further includes a damped elastic mechanism to moderate movement of the suspension structure parallel to the rotational axis, whereby the aircraft has improved yaw control in vertical flight.

17. A method for transporting a payload with a craft having a lift unit that includes a motor and a wing, comprising:
  (a) orienting the lift unit vertically with respect to the ground and operating the motor to lift the payload;
  (b) transitioning the lift unit to a horizontal orientation with respect to the ground;
  (c) operating the motor to move the craft horizontally and thereby cause the wing to generate lift; and
  (d) during parts (a) through (c), suspending the payload from the lift unit wherein the payload is free to pivot with respect to the lift unit about a first axis while substantially restricting pivotal movement about all axes orthogonal thereto.

18. The craft of claim 17 wherein operating the motor comprises operating a pair of counter-rotating propellers, one of the propellers being positioned in front of and rotating counter to the other propeller, whereby the aircraft has improved pitch and yaw control in vertical flight.

19. The method of ciaim 17 further comprising positioning the payload to impart pendular stability to the vehicle.

20. The method of claim 17 further comprising moderating the pivotal movement of the payload about vehicle axes orthogonal to the first axis.

* * * * *

UNITED STATES PATENT AND TRADEMARK OFFICE
CERTIFICATE OF CORRECTION

PATENT NO. : 7,059,562 B2
APPLICATION NO. : 10/931801
DATED : June 13, 2006
INVENTOR(S) : G. Douglas Baldwin It is certified that error appears in the above-identified patent and that said Letters Patent is hereby corrected as shown below:

On the title page: Item [63] At column 1, replace the paragraph under Cross-Reference to Related Applications, with the following paragraph:

-- This application is a continuation of U.S. application Serial No. 09/976,348, filed on October 12, 2001, now U.S. Patent 6,783,096, which claims benefit of U.S. provisional application Serial No. 60/265,193 filed on January 31, 2001. --

Signed and Sealed this

Twenty-fourth Day of April, 2007

JON W. DUDAS
*Director of the United States Patent and Trademark Office*